US012439358B2

(12) United States Patent
Vahidi Mazinani et al.

(10) Patent No.: US 12,439,358 B2
(45) Date of Patent: Oct. 7, 2025

(54) DETERMINATION OF TRUST RELATIONSHIP OF NON-3GPP ACCESS NETWORKS IN 5GC

(71) Applicant: Telefonaktiebolaget LM Ericsson (publ), Stockholm (SE)

(72) Inventors: Helena Vahidi Mazinani, Lund (SE); David Castellanos Zamora, Madrid (ES); Ivo Sedlacek, Hovorcovice (CZ); Christine Jost, Dalby (SE); Vesa Lehtovirta, Espoo (FI); Noamen Ben Henda, Vällingby (SE); Monica Wifvesson, Lund (SE); Cheng Wang, Shanghai (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 366 days.

(21) Appl. No.: 17/801,073

(22) PCT Filed: Feb. 19, 2021

(86) PCT No.: PCT/EP2021/054109
§ 371 (c)(1),
(2) Date: Aug. 19, 2022

(87) PCT Pub. No.: WO2021/165446
PCT Pub. Date: Aug. 26, 2021

(65) Prior Publication Data
US 2023/0080836 A1    Mar. 16, 2023

(30) Foreign Application Priority Data
Feb. 21, 2020    (WO) ............... PCT/CN2020/076206

(51) Int. Cl.
*H04W 60/04*   (2009.01)
*H04W 12/08*   (2021.01)
(Continued)

(52) U.S. Cl.
CPC ........... *H04W 60/04* (2013.01); *H04W 12/08* (2013.01); *H04W 60/06* (2013.01); *H04W 76/12* (2018.02)

(58) Field of Classification Search
CPC ...................... H04W 12/041; H04L 12/2818
See application file for complete search history.

(56) References Cited

U.S. PATENT DOCUMENTS

2020/0162898 A1*  5/2020  Nair .................... H04W 12/082
2020/0245284 A1*  7/2020  Hans ....................... H04W 8/12
(Continued)

FOREIGN PATENT DOCUMENTS

| CA | 3106505 A1 | 2/2020 |
| WO | 2020006515 A1 | 1/2020 |

OTHER PUBLICATIONS

International Search Report and Written Opinion of the International Searching Authority for PCT International Application No. PCT/EP2021/054109 dated May 10, 2021.
(Continued)

*Primary Examiner* — Fabricio R Murillo Garcia
(74) *Attorney, Agent, or Firm* — Sage Patent Group

(57) ABSTRACT

A serving network establishes a connection with a UE via an N3AN using a trusted registration procedure to establish a secure access link between the UE and the serving network via the N3AN. The serving network sends a trust indication message via the N3AN to the UE using the secure access link to identify the N3AN as trusted or untrusted. When the received trust indication message indicates the N3AN is untrusted, the serving network executes an untrusted registration procedure with the UE using the secure access link to establish the connection between the UE and the serving network. When the received trust indication message indicates the N3AN is trusted, the serving network continues execution of the initial registration with the UE using the
(Continued)

trusted registration procedure to establish the connection between the UE and the serving network. The UE and serving network exchange messages via the established connection.

16 Claims, 22 Drawing Sheets

(51) Int. Cl.
*H04W 60/06* (2009.01)
*H04W 76/12* (2018.01)

(56) References Cited

U.S. PATENT DOCUMENTS

2021/0136582 A1* 5/2021 Liu ................... H04W 12/06
2021/0306849 A1* 9/2021 Liu ................... H04W 12/086
2021/0360569 A1* 11/2021 Park .................. H04W 8/02
2022/0201793 A1* 6/2022 Nair .................. H04W 4/20

OTHER PUBLICATIONS

Ericsson, "Introducing missing definitions of untrusted and trusted non-3GPP accesses," S3-194530, 3GPP TSG-SA3 Meeting #97, Reno, US, Nov. 18-22, 2019, 5 pages.
3GPP TS 23.502 V16.3.0, "3rd Generation Partnership Project; Technical Specification Group Services and System Aspects; Procedures for the 5G System (5GS); Stage 2 (Release 16)," Dec. 2019, 558 pages.
European Office Action, European Patent Application No. 21707217.2, mailed Aug. 20, 2025, 5 pages.

* cited by examiner

DETERMINATION OF TRUST RELATIONSHIP OF NON-3GPP ACCESS NETWORKS IN 5GC

CROSS-REFERENCE TO RELATED APPLICATIONS

This application is a 35 U.S.C. § 371 national stage application of PCT International Application No. PCT/EP2021/054109 filed Feb. 19, 2021, which claims the benefit of PCT Application No. PCT/CN2020/076206 filed Feb. 21, 2020, the contents of which are hereby incorporated by reference herein.

TECHNICAL FIELD

The solution presented herein relates generally to connections between User Equipment (UE) and non-3rd Generation Partnership Project (non-3GPP) access nodes, and more particularly to establishing connections between UEs and untrusted non-3GPP access nodes.

BACKGROUND

The $3^{rd}$ Generation Partnership Project (3GPP) is working on mechanisms how a User Equipment (UE) can access the $5^{th}$ Generation (5G) core network via non-3GPP access networks in Technical Specification (TS) 23.501 v. 16.2.0, 23.502 v. 16.2.0, 33.501 v. 16.0.0. The current state of the work in Rel-16 is recorded in 3GPP SA3-contribution S3-194529, which is incorporated by reference herein. There are two types of non-3GPP access networks (hereafter also called N3AN for brevity), so called trusted and untrusted N3ANs.

The access mechanisms for trusted and untrusted N3ANs are different: for untrusted N3ANs an encrypted Internet Protocol Security (IPsec) tunnel is established between the UE and the core network over the N3AN because the protection mechanisms of the N3AN are not trusted to be sufficiently secure, whereas for trusted N3ANs an encrypted Internet Protocol security (IPsec) tunnel is not established as the protection mechanisms of the N3AN are trusted to be sufficiently secure.

It is the Home Public Land Mobile Network (HPLMN) operator's decision if a N3AN is considered as trusted or untrusted N3AN. The HPLMN operator's decision is generally based on security reasons, but may additionally be based on reasons not related to security. In any event, there are scenarios where an N3AN advertises as supporting trusted connectivity, but the UE considers them untrusted due to its HPLMN's decision. Typical solutions in this case require user input and/or have privacy problems and/or prevent registration. Thus, there remains a need for improved solutions for accessing non-3GPP networks via untrusted N3ANs.

SUMMARY

One exemplary embodiment comprises a method of establishing a connection between a UE and a serving network via a non-3GPP access network (N3AN). The method is implemented by the UE and comprises, during an initial registration with the serving network, using a trusted registration procedure. The method further comprises receiving a trust indication message from the serving network via the N3AN using a secure access link established by the serving network via the N3AN responsive to the trusted registration procedure. The trust indication message identifies the N3AN as trusted or untrusted as determined by the serving network. When the received trust indication message indicates the N3AN is untrusted, the method further comprises executing an untrusted registration procedure with the serving network via the N3AN using the secure access link to establish the connection between the UE and the serving network. When the received trust indication message indicates the N3AN is trusted, the method further comprises continuing execution of the initial registration with the serving network via the N3AN using the trusted registration procedure to establish the connection between the UE and the serving network. The method further comprises exchanging messages with the serving network via the established connection.

One exemplary embodiment comprises a UE configured to establish a connection with a serving network via an N3AN. The UE comprises one or more processing circuits configured to implement the UE method disclosed herein.

One exemplary embodiment comprises a method of establishing a connection between a UE and a serving network via an N3AN. The method is implemented by a home network of the UE and comprises receiving a trust indication request from the serving network responsive to an initial registration of the UE with the serving network via the N3AN using a trusted registration procedure. The method further comprises determining whether the N3AN is trusted or untrusted, and generating a trust indication message identifying whether the N3AN is trusted or untrusted. The method further comprises sending the trust indication message to the UE via a secure access link established by the serving network via the N3AN responsive to the initial registration to facilitate establishment of the connection between the UE and the serving network.

One exemplary embodiment comprises a home network of a UE configured to establish a connection between the UE and a serving network via an N3AN. The home network comprises one or more processing circuits configured to implement the home network method disclosed herein.

One exemplary embodiment comprises a method of establishing a connection between a UE and a serving network via an N3AN. The method is implemented by the serving network and comprises, during an initial registration with the serving network, using a trusted registration procedure. The method further comprises sending a trust indication message to the UE via the N3AN using a secure access link established with the UE via the N3AN responsive to the trusted registration procedure. The trust indication message identifies the N3AN as trusted or untrusted as determined by the serving network. When the trust indication message indicates the N3AN is untrusted, the method further comprises executing an untrusted registration procedure with the UE via the N3AN using the secure access link to establish the connection between the UE and the serving network. When the trust indication message indicates the N3AN is trusted, the method further comprises continuing execution of the initial registration with the UE via the N3AN using the trusted registration procedure to establish the connection between the UE and the serving network. The method further comprises exchanging messages with the UE via the established connection.

In one exemplary embodiment, the serving network method further comprises the serving network determining whether the N3AN is trusted or untrusted for the purpose of establishing a connection between the UE and the serving network via the N3AN by sending a trust indication request to a home network of the UE responsive to the initial registration of the UE with the serving network via the N3AN using the trusted registration procedure, receiving a trust indication from the home network of the UE, the received trust indication identifying the N3AN as trusted or untrusted, and sending the trust indication message generated responsive to the received trust indication to the UE via the secure access link.

One exemplary embodiment comprises a serving network of a UE configured to establish a connection between the UE and the serving network via an N3AN. The serving network comprises one or more processing circuits configured to implement the serving network method disclosed herein.

DETAILED DESCRIPTION

The solution presented herein provides improved techniques for accessing non-3GPP networks via untrusted non-3GPP access networks (N3ANs). Before describing details of the solution presented herein, the following first describes general procedures for accessing untrusted and trusted N3ANs.

Figure 1:
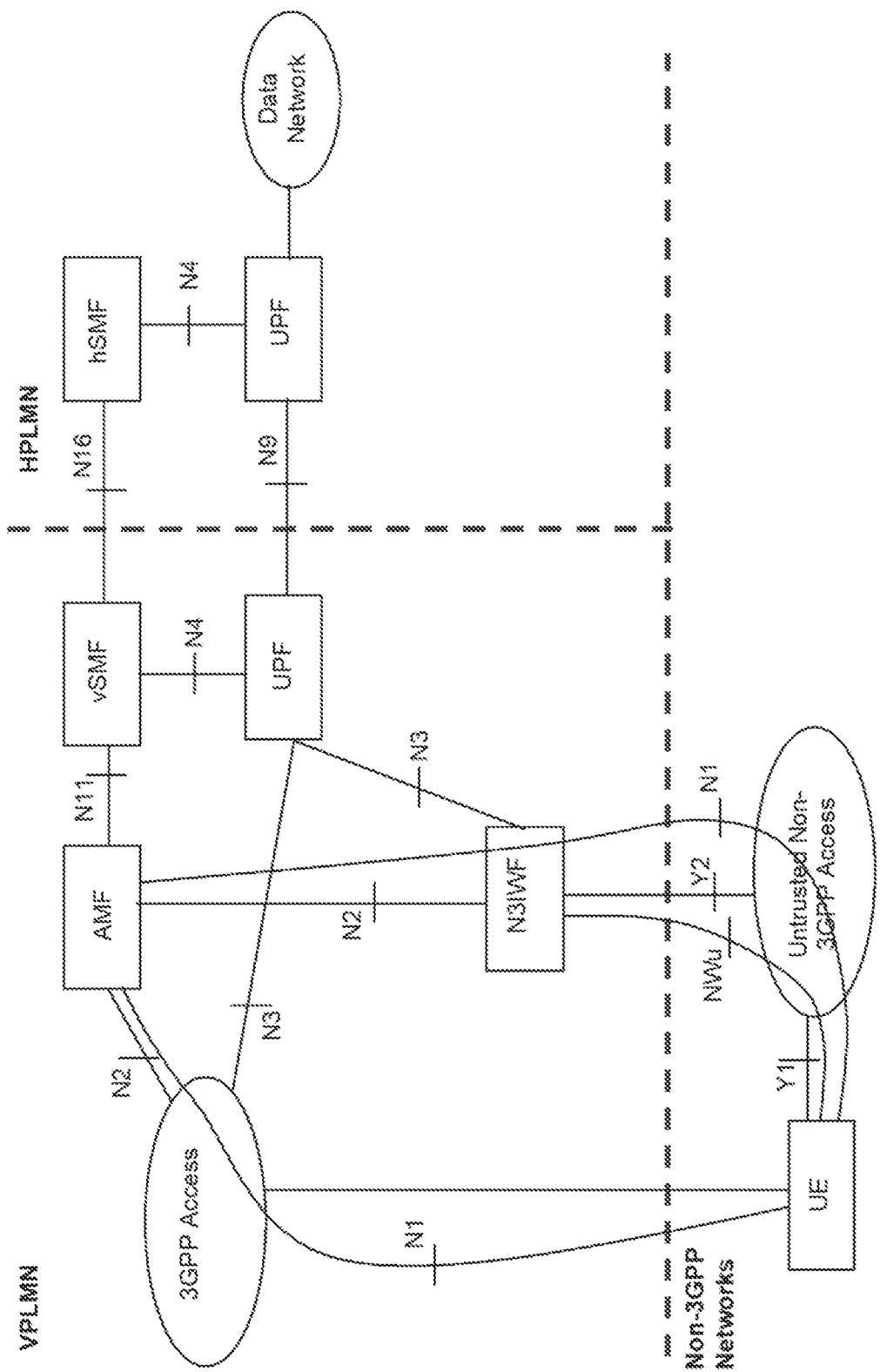
FIG. 1 shows a home-routed architecture for 5G Core Network with untrusted non-3GPP access.
Figure 2:
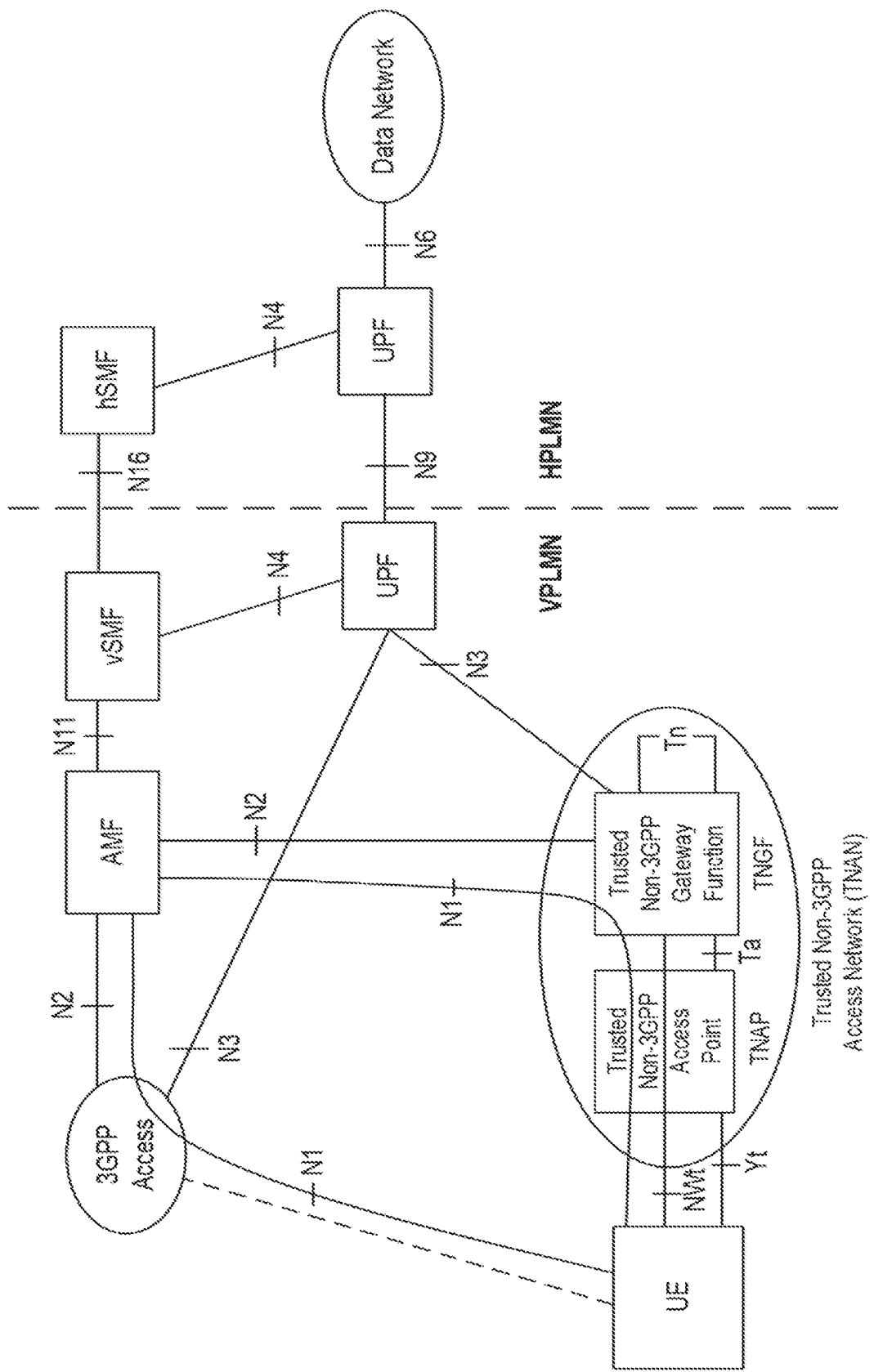
FIG. 2 shows a home-routed architecture for 5G Core Network with trusted non-3GPP access.

As noted above, 3GPP is working on mechanisms how a UE can access the 5th Generation (5G) core network via non-3GPP access networks in TS 23.501 v. 16.2.0, 23.502 v. 16.2.0, 33.501 v. 16.0.0. FIG. 1 shows an architecture from TS 23.501 v. 16.2.0 for untrusted non-3GPP access, while FIG. 2 shows an architecture from TS 23.501 v. 16.2.0 for trusted non-3GPP access.

TS 33.501 v. 16.0.0 clause 7.2.1 describes current procedures for authentication of untrusted non-3GPP access. This technical specification specifies how a UE may be authenticated to 5G network via an untrusted non-3GPP access network. It uses a vendor-specific Extensible Authentication Protocol (EAP) method called "EAP-5G", utilizing the "Expanded" EAP type and the existing 3GPP Vendor-Id, registered with Internet Assigned Numbers Authority (IANA) under the Structure and identification of Management Information (SMI) Private Enterprise Code registry for TCP/IP-based internets. The "EAP-5G" method is used between the User Equipment (UE) and the Non-3GPP Interworking Function (N3IWF) and is utilized for encapsulating Non-Access Stratum (NAS) messages. If the UE needs to be authenticated by the 3GPP home network, any of the authentication methods as described in clause 6.1.3 of TS 33.501 v. 16.0.0 can be used. The method is executed between the UE and Authentication Server Function (AUSF), as shown below. When possible, the UE is authenticated by reusing the existing UE NAS security context in the Access and mobility Management Function (AMF).

Figure 3:
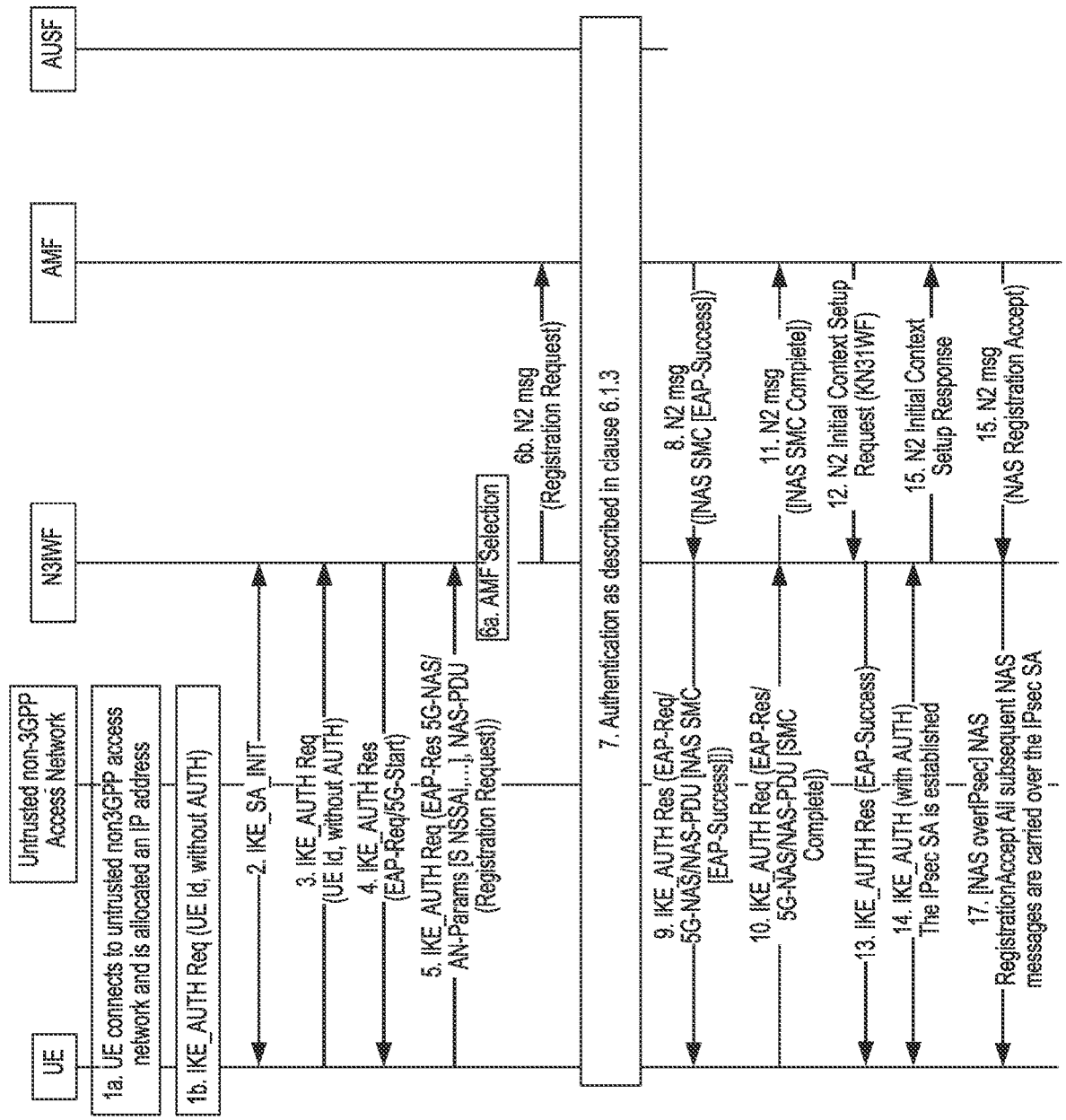
FIG. 3 shows an exemplary process for establishing a connection between a UE and an untrusted N3AN.

FIG. 3 shows an exemplary Authentication for untrusted non-3GPP access, and is described further as follows.

1. The UE connects to an untrusted N3AN with procedures outside the scope of 3GPP. When the UE decides to attach to $5^{th}$ Generation Core (5GC) network, the UE selects an N3IWF in a 5G Public Land Mobile Network (PLMN), as described in TS 23.501 v. 16.2.0 clause 6.3.6.

2. The UE proceeds with the establishment of an Internet Protocol Security (IPsec) Security Association (SA) with the selected N3IWF by initiating an Internet Key Exchange (IKE) initial exchange according to RFC 7296. After step 2, all subsequent IKE messages are encrypted and integrity protected by using the IKE SA established in this step.

3. The UE initiates an IKE_AUTH exchange by sending an IKE_AUTH request message. The AUTH payload is not included in the IKE_AUTH request message, which indicates that the IKE_AUTH exchange uses EAP signalling (in this case EAP-5G signalling). As per the RFC 7296, in the IDi the UE sets the Identifier (ID) type as ID_KEY-ID in this message and set its value equal to any random number. The UE does not use its GUTI (Globally Unique Temporary Identifier), SUCI (Subscription Concealed Identifier), or Subscription Permanent Identifier (SUPI) as the identifier in this step. If the UE is provisioned with the N3IWF root certificate, it will include the CERTREQ payload within the IKE_AUTH request message to request N31WF's certificate.

4. The N3IWF responds with an IKE_AUTH response message which includes the N3IWF identity, the AUTH payload to protect the previous message it sent to the UE (in the IKE_SA_INIT exchange) and an EAP-Request/5G-Start packet. The EAP-Request/5G-

Start packet informs the UE to initiate an EAP-5G session, i.e. to start sending NAS messages encapsulated within EAP-5G packets. If the UE has sent a CERTREQ payload in step 3, the N3IWF also includes the certificate (CERT) payload including N3IWF certificate.

5. The UE validates the N3IWF certificate and confirms that the N3IWF identity matches the N3IWF selected by the UE. An absence of the certificate from the N3IWF if the UE had requested the certificate or unsuccessful identity confirmation will result in a connection failure. The UE sends an IKE_AUTH request which includes an EAP-Response/5G-NAS packet that contains a Registration Request message containing UE security capabilities and the SUCI. If UE is already with the 5GC over 3GPP access and there is an available security context, the UE integrity protects the Registration Request message and sends the 5G-GUTI instead of SUCI. The N3IWF refrains from sending an EAP-Identity request. The UE may ignore an EAP Identity request or respond with the SUCI it sent in the Registration Request. If the UE has registered to the same Access and Mobility Management Function (AMF) through 3GPP access, and if this is the first time that the UE connects to the 5GC through non-3GPP access, the value of corresponding UL NAS COUNT used for integrity protection is 0; else it can use the existing non-3GPP specific UL NAS COUNT for integrity protection NOTE: The N3IWF does not send an EAP-Identity request because the UE includes its identity in the IKE_AUTH request in message 5. This is in line with RFC 7296, clause 3.16.

6. The N3IWF selects an AMF as specified in TS 23.501 v. 16.2.0, clause 6.5.3. The N3IWF forwards the Registration Request received from the UE to the AMF.

7. If the AMF receives a 5G-GUTI and the Registration is integrity protected, it may use the security context to verify the integrity protection as describe in clause 6.4.6. If the UE has registered to the same AMF through 3GPP access, and if this is the first time that the AMF receives UE's NAS signalling through non-3GPP access, the value of corresponding UL NAS COUNT used for integrity verification is 0; else it can use the existing non-3GPP specific UL NAS COUNT for integrity verification. If integrity is verified successfully, it indicates that UE is authenticated by AMF. If integrity is verified successfully and no newer security context has been activated over the 3GPP access, then step 8 to step 11 may be skipped. If integrity is verified successfully and a newer security context has been activated over the 3GPP access then authentication may be skipped but the AMF activates the newer context with a NAS SMC procedure as described in step 8 and onwards. Otherwise, the AMF authenticates the UE.

If the AMF decides to authenticate the UE, it uses one of the methods from clause 6.1.3. In this case, the AMF sends a key request to the AUSF. The AUSF may initiate an authentication procedure as specified in clause 6.1.3. Between AMF and UE, the authentication packets are encapsulated within NAS authentication messages and the NAS authentication messages are carried in N2 signalling between the AMF and N3IWF, and then are encapsulated within EAP-5G/5G-NAS packets between the N3IWF and the UE.

In the final authentication message from the home network, the AUSF sends the anchor key $K_{SEAF}$ derived from $K_{AUSF}$ to the Security Anchor Function (SEAF). The SEAF derives the $K_{AMF}$ from $K_{SEAF}$ and send it to the AMF which is used by the AMF to derive NAS security keys. If EAP-AKA' (Improved EAP method for $3^{rd}$ generation Authentication and Key Agreement) is used for authentication as described in clause 6.1.3.1, then the AUSF includes the EAP-Success. The UE also derives the anchor key $K_{SEAF}$ and from that key it derives the $K_{AMF}$ followed by NAS security keys. The NAS COUNTs associated with NAS connection identifier "0x02" are set at the UE and AMF.

8. The AMF sends a Security Mode Command (SMC) to the UE in order to activate NAS security associated with NAS connection identifier "0x02". This message is first sent to N3IWF (within an N2 message). If EAP-AKA' is used for authentication, the AMF encapsulates the EAP-Success received from AUSF within the SMC message.

9. The N3IWF forwards the NAS SMC to UE within an EAP-Request/5G-NAS packet.

10. The UE completes the authentication (if initiated in step 7) and creates a NAS security context or activates another one based on the received ngKSI (Key Set Identifier in 5G) in the NAS SMC. UE responds to the NAS SMC it received from the AMF based on the selected algorithms and parameters as described in clause 6.7.2. The UE encapsulates the NAS SMC Complete in the EAP-5G Response.

11. The N3IWF forwards the NAS packet containing NAS SMC Complete to the AMF over the N2 interface.

12. The AMF upon reception of the NAS SMC Complete from the UE or upon success of integrity protection verification, initiates the Next Generation Application Protocol (NGAP) procedure to set up the Access Network (AN) context. AMF computes the N3IWF key, $K_{N3/WF}$, using the uplink NAS COUNT associated with NAS connection identifier "0x02" as defined in Annex A.9 for the establishment of the IPsec SA between the UE and the N3IWF and includes it in the NGAP Initial Context Setup Request sent to the N3IWF.

13. N3IWF sends an EAP-Success/EAP-5G to the UE upon reception of the NGAP Initial Context Setup Request containing the N3IWF key, $K_{N3/WF}$. This completes the EAP-5G session and no further EAP-5G packets are exchanged. If the N3IWF does not receive the $K_{N3/WF}$ from AMF, the N3IWF responds with an EAP-Failure 14. The IPsec SA is established between the UE and N3IWF by using the N3IWF key $K_{N3/WF}$ that was created in the UE using the uplink NAS COUNT associated with NAS connection identifier "0x02" as defined in Annex A.9 and was received by N3IWF from the AMF in step 12.

15. Upon successful establishment of the IPsec SA between the UE and the N3IWF, the N3IWF sends the NGAP Initial Context Setup Response message to the AMF.

16. When NGAP Initial Context Setup Response for the UE is received by the AMF, AMF sends the NAS Registration Accept message for the UE over the N2 towards the N3IWF.

17. Upon receiving the NAS Registration Accept message from the AMF, the N3IWF forwards it to the UE over the established IPsec SA. All further NAS messages between the UE and the N3IWF are sent over the established IPsec SA.

Figure 4A:
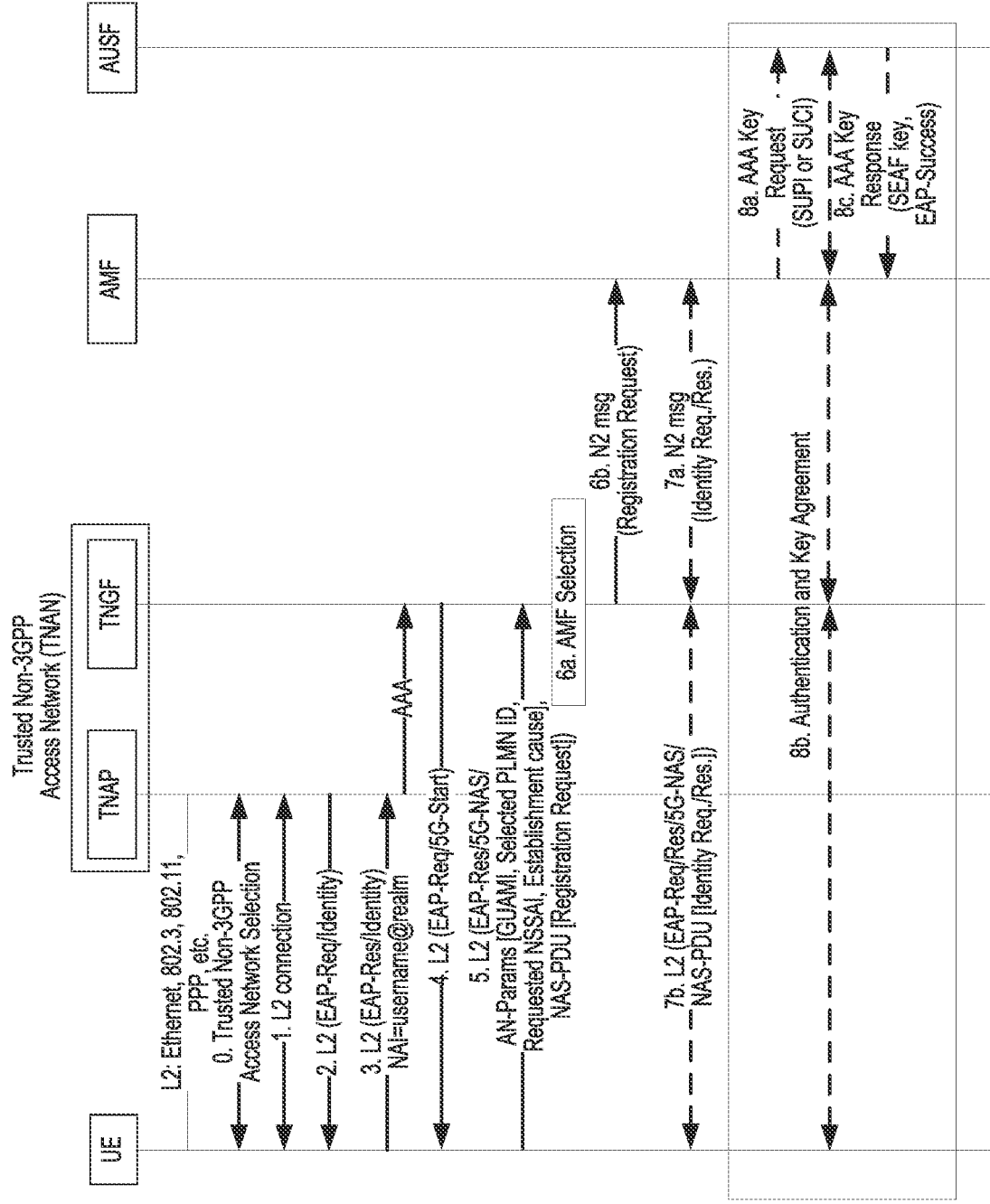
FIGS. 4A-4B shows an exemplary process for establishing a connection between a UE and a trusted N3AN.
Figure 4B:
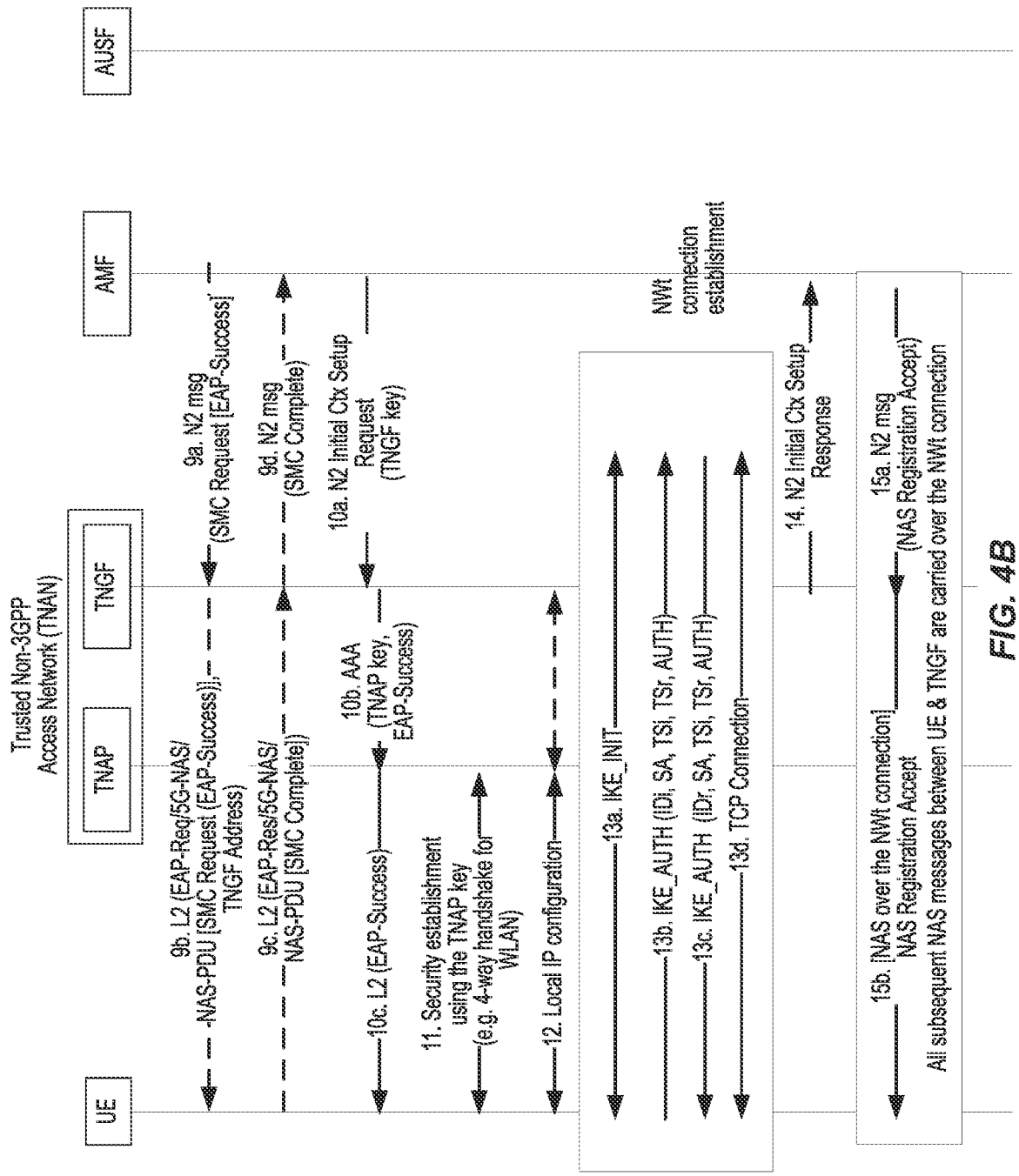

FIGS. 4A-4B shows a current registration/authentication and Packet Data Unit (PDU) session establishment procedure for trusted non-3GPP access from 3GPP SA3-contribution S3-194529 clause 7A.b.x: Authentication for Trusted non-3GPP access, which specifies how a UE is authenticated to 5G network via a trusted non-3GPP access network. FIGS. 4A-4B is based on the specified procedure in TS 23.502 v. 16.2.0 clause 4.12a.2.2 "Registration procedure for trusted non-3GPP access." The authentication procedure is similar to the authentication procedure for trusted non-3GPP access defined in clause 7.2.1 with few differences, which are mentioned in further detail below.

0. The UE selects a PLMN and a Trusted N3AN (TNAN) for connecting to this PLMN by using the TNAN selection procedure specified in TS 23.501 v. 16.2.0 clause 6.3.12. During this procedure, the UE discovers the PLMNs with which the TNAN supports trusted connectivity (e.g. "5G connectivity").

1 A layer-2 connection is established between the UE and the Trusted Non-3GPP Access Point (TNAP). In case of IEEE 802.11, this step corresponds to an 802.11 Association. In case of Point-to-Point Protocol (PPP), this step corresponds to a PPP Link Control Protocol (LCP) negotiation. In other types of non-3GPP access (e.g. Ethernet), this step may not be required.

2-3. An EAP authentication procedure is initiated. EAP messages are encapsulated into layer-2 packets, e.g. into IEEE 802.3/802.1×packets, into IEEE 802.11/802.1× packets, into PPP packets, etc. The UE provides a Network Access Identifier (NAI) that triggers the TNAP to send an Authentication, Authorization and Accounting (AAA) request to a Trusted Non-3GPP Gateway Function (TNGF). Between the TNAP and TNGF, the EAP packets are encapsulated into AAA messages.

4-10. An EAP-5G procedure is executed as specified in clause 7.2.1 with the following modifications:
The EAP-5G packets are not encapsulated into IKEv2 packets.
A $K_{TNGF}$ as specified in clause Annex A.9 (equivalent to $K_{N3IWF}$) is created in the UE and in the AMF after the successful authentication. The $K_{TNGF}$ is transferred from the AMF to TNGF in step 10a (within the N2 Initial Context Setup Request).
The TNAP is a trusted entity. The TNGF generates the $K_{TNAP}$ and transfers it from TNGF to TNAP in step 10b (within an AAA message). The $K_{TNAP}$ depends on the non-3GPP access technology, e.g. it is a Pairwise Master Key in the case of IEEE 802.11) and can be derived from the TNGF key, e.g. by using the first 32 bytes of the TNGF key.
In step 9b the UE receives the "TNGF Contact Info" which includes the IP Address of TNGF to which NAS signalling should be sent.

11. The common TNAP key is used by the UE and TNAP to derive security keys according to the applied non-3GPP technology and to establish a security association to protect all subsequent traffic. In case of IEEE 802.11, the $K_{TNAP}$ is the Pairwise Master Key (PMK) and a 4-way handshake is executed (see IEEE 802.11) which establishes a security context between the Wireless Local Area Network (WLAN) Access Point (AP) and the UE that is used to protect unicast and multicast traffic over the air. All messages between UE and TNAP are encrypted and integrity protected from this step onwards.
NOTE: whether step 11 is performed out of the scope of this specification. The current procedure assumes the encryption protection over Layer-2 between UE and TNAP is to be enabled.

12. The UE receives IP configuration from the TNAN, e.g. with Dynamic Host Configuration Protocol (DHCP).

13. The UE initiates an IKE_INIT exchange with the TNGF. The UE has received the IP address of TNGF during the EAP-5G signalling in step 9b, subsequently, the UE initiates an IKE_AUTH exchange and provides its SUPI or 5G-GUTI identity. The common $K_{TNGF}$ is used for mutual authentication. NULL encryption is negotiated as specified in RFC 2410. After step 13c, an IPsec SA is established between the UE and TNGF (i.e., a NWt connection) and it is used to transfer all subsequent NAS messages. This IPsec SA does not apply encryption but only apply integrity protection.

14. After the NWt connection is successfully established, the TNGF responds to AMF with an N2 Initial Context Setup Response message.

15. Finally, the NAS Registration Accept message is sent by the AMF and is forwarded to UE via the established NWt connection.

16-18. The UE initiates a Protocol Data Unit (PDU) session establishment. This is carried out exactly as specified in TS 23.502 v. 16.2.0 clause 4.12a.5. The TNGF may establish one or more IPsec child SA's per PDU session.

19. User plane data for the established PDU session is transported between the UE and TNGF inside the established IPsec child SA.

The existing solutions for establishing have multiple issues. First, there is a lack of 3GPP-based access authentication when a UE registers to 5GC via an untrusted non-3GPP access. In case of trusted non-3GPP access network, as is being specified in Rel-16, access authentication is part of the 5G registration procedures over the trusted non-3GPP access network. For example, the non-3GPP access network conveys EAP packets between the UE and TNGF and eventually receives EAP Success and a key from the TNGF which is used to set-up the security over the access link between the UE and non-3GPP access network. After this the UE gets IP connectivity thru the non-3GPP access network.

In case of untrusted non-3GPP access network, as is defined for Rel-15, access authentication is out of scope of 3GPP in 5G. For example, it is assumed to happen "in some way" so that the UE gets IP connectivity across the untrusted non-3GPP access network. After getting IP connectivity, the UE can start 5G registration to 5GC using IKEv2 with the N3IWF.

3GPP-based access authentication has not been defined for untrusted non-3GPP access networks in 5G, however. This causes problems such as described in the following.

Consider a case where the UE sees only such non-3GPP access networks which advertise to support trusted connectivity to UE's home PLMN or PLMNs to which the UE could roam to. However, the UE, by configuration, considers these access networks to be untrusted. (As described above the trust decision is made by the home network of the UE and it is not a characteristic of the access network.). For example, trusted non-3GPP access networks may be pre-configured in the UE and/or the HPLMN may send an integrity trust indication to the UE during the registration procedure indicating whether the non-3GPP IP access is trusted. If no such indication is received by the UE, and there is no pre-configured information in the UE, then the UE shall consider the non-3GPP IP access as untrusted. How does the UE get IP connectivity over the non-3GPP access in such situations in order to register to 5GC?

A) One possibility is that some of the non-3GPP access networks support also some other access authentication mechanism, i.e. authentication out of scope of 3GPP, e.g., password-based access authentication.

B) Another possibility is that some of the non-3GPP access operators have an agreement with a 3GPP operator (UE's home operator or roaming partner) to support 3GPP-based access authentication via Evolved Packet System (EPS).

Using possibility A would mean manual intervention of the user to type the password on the phone. This would be bad for user experience.

Using possibility B would mean that the IMSI is exposed over the non-3GPP access network since the SUCI mechanism is not supported in 4th Generation (4G). This would make the use of SUCI practically useless in the subsequent registration procedure to 5GC. If it further happens so that using untrusted non-3GPP access will be dominant compared to using trusted non-3GPP access in 5G (as is the case for 4G), the privacy problem will become even more evident.

If neither possibility A nor possibility B is available, the UE cannot get IP connectivity and therefore cannot register to the 5GC at all. To avoid this to happen, some operators might apply possibility A and/or B, which are not optimal due to reasons described above.

To allow connectivity of UEs to 5GC in as many cases as possible and to protect users' privacy and smooth user experience a solution for 3GPP-based access authentication for accessing 5GC via untrusted non-3GPP access networks is needed.

Another problem, which is related to the first problem described above, is when to indicate to the UE whether the HPLMN considers the non-3GPP access network trusted or untrusted. In order to use 3GPP-based access authentication for both cases when the non-3GPP access is considered trusted or untrusted by the home network of the UE, the UE, Serving Network (SN), and Home Network (HN) need to agree which registration procedure (i.e., registration procedure for trusted or untrusted access network) is to be performed. In $4^{TH}$ Generation (4G) it is the home network of the UE who decides if a non-3GPP access network is trusted or untrusted. The same principle has also been agreed to be used in 5G (see 3GPP SA3-contribution S3-194529 "living CR for 5WWC"). This is also in line with the principle of increased home network control of the UE, e.g. regarding authentication.

The UE needs to know the trust decision of the HPLMN in order to run the correct access procedures for a specific N3AN.

In 4G system the trust relationship may be configured in the UE or the UE may receive a trust indication during 3GPP-based access authentication within EAP-AKA'. If neither of these is available in the UE, the UE considers the N3AN as untrusted.

5G has unified authentication architecture which means that either EAP-AKA' or 5G-AKA (5G Authentication and Key Agreement) can be used over any access type for primary authentication based on the home network's decision. This means that if the trust indication can be sent only within EAP-AKA' it cannot be sent when 5G-AKA is used for primary authentication. Additionally, primary authentication is not always performed in 5G when a UE accesses 5GC over N3AN. This is because the UE may be already registered to the same PLMN via 3GPP access network. In this case the NAS security context in the AMF can be used to authenticate the UE and a new primary authentication is not performed, and consequently a trust indication cannot be sent within EAP-AKA'.

A related idea was described in 3GPP in S3-194287, where a trust indication list can be sent to the UE in a UE Parameters Update (UPU) or Steering of Roaming (SoR) mechanism.

The solution presented herein provides a way for UEs to access 5G via untrusted N3ANs by using 3GPP-based access authentication, according to:

If a UE detects a non-3GPP access network which advertises "trusted connectivity" to UE's HPLMN (or UE's roaming PLMN), the UE starts registration procedures for trusted N3AN via TNGF regardless if it considers the non-3GPP access network as trusted or untrusted.

After authenticating the UE (i.e. by successfully verifying an integrity protected Registration Request message or performing a primary authentication procedure), the Visited PLMN (VPLMN) contacts HPLMN and HPLMN decides if the non-3GPP access network is considered trusted or untrusted. A protected trust indication message is sent from HPLMN to VPLMN, and then to the UE via NAS signaling. NAS security is established via TNGF, access authentication is completed from non-3GPP access network point of view, access link security between the UE and non-3GPP access network is set-up (if required), and IP address is allocated to the UE.

In case the trust indication indicated untrusted non-3GPP access network, registration to 5GC is performed via N3IWF: the UE sends a new registration request via N3IWF using untrusted procedures over IKE as defined today with the modification that NAS security from previous phase is used to protect the registration request and no new primary authentication is needed over the untrusted non-3GPP access. This is the main use case in the invention and has a set of embodiments.

In case the trust indication indicated trusted non-3GPP access network, the registration procedure continues as is defined today for trusted N3ANs via TNGF. This is another use case in the invention with another set of embodiments.

The solution presented herein provides multiple advantages, by providing a way for UEs to access 5GC via untrusted non-3GPP access networks by using 3GPP-based access authentication. Such a solution:

is efficient because 5G (primary) authentication and also NAS security which are established during access authentication via TNGF can be re-used when the UE subsequently performs registration via N3IWF for untrusted non-3GPP access network. In 4G the 3GPP-based access authentication was not re-used when the UE was accessing the 4G Core (4GC) via evolved Packet Data Gateway (ePDG) using procedures for untrusted non-3GPP access network.

is privacy preserving because the 3GPP-based access authentication is in fact the primary authentication, the Subscriber Concealed Identity (SUCI) mechanism can be used. Lack of this mechanism could mean that UEs use the 3GPP-based access authentication for 4G to get IP connectivity, which would mean exposure of the IMSI or SUPI to eavesdropping.

enhances connectivity possibilities for UEs because there is a new of way providing IP connectivity to UEs.

Figure 5A:
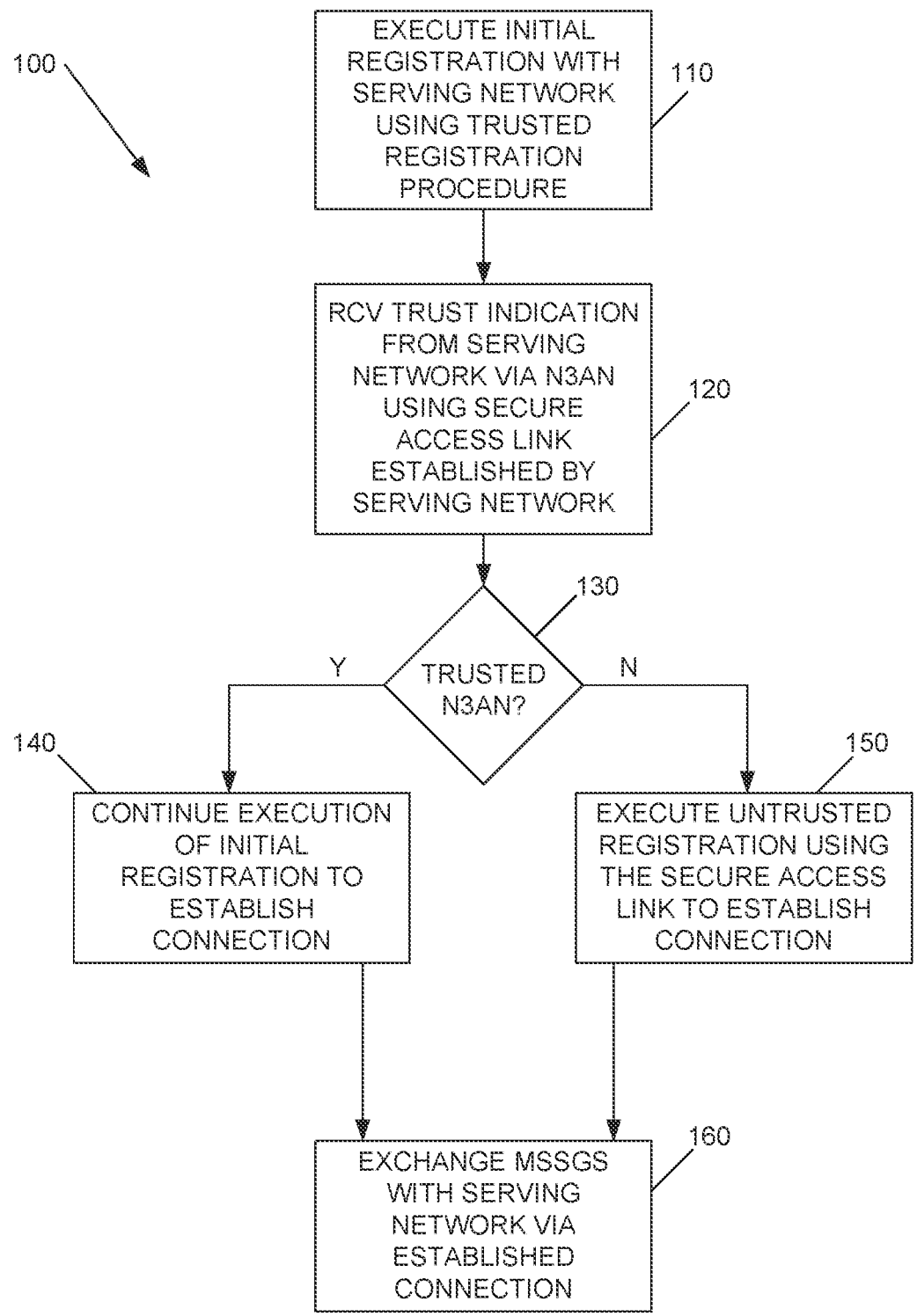
FIG. 5A shows an exemplary method from the perspective of a UE for establishing a connection between the UE and a serving network via an N3AN according to exemplary embodiments of the solution presented herein.
Figure 5B:
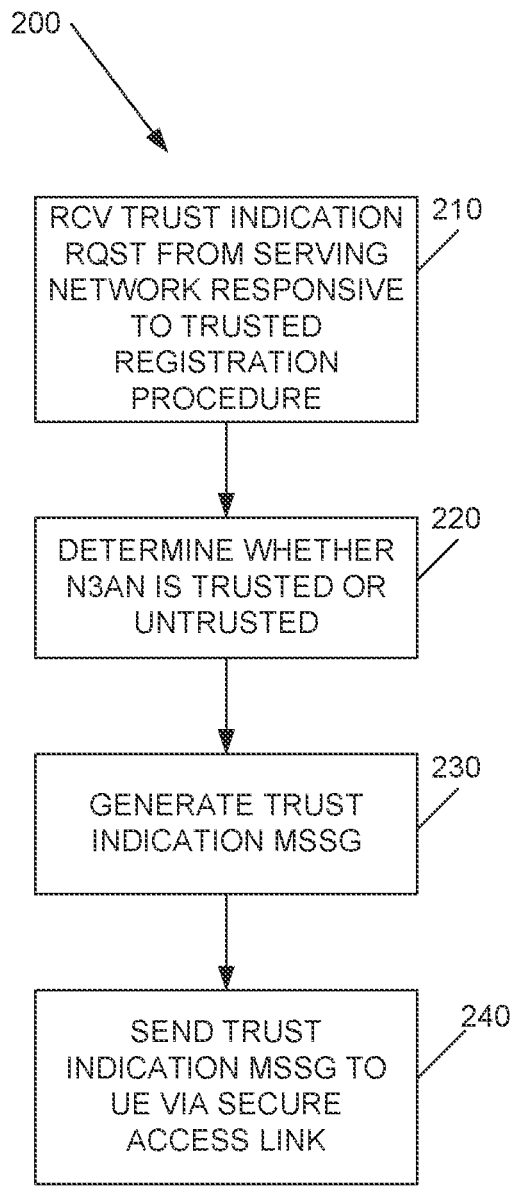
FIG. 5B shows an exemplary method from the perspective of a home network for a UE for establishing a connection between the UE and a serving network via an N3AN according to exemplary embodiments of the solution presented herein.
Figure 5C:
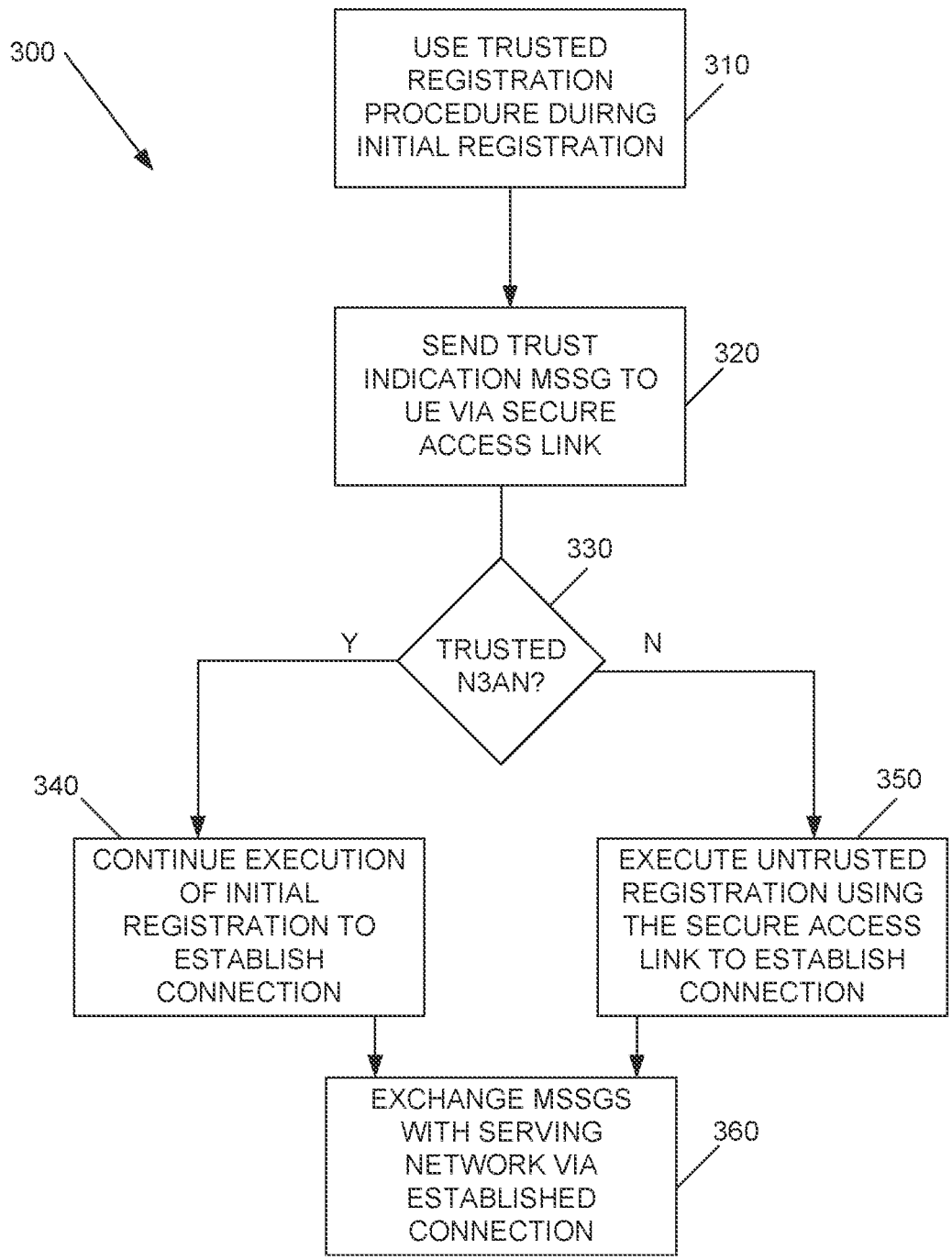
FIG. 5C shows an exemplary method from the perspective of a serving network for a UE for establishing a connection between the UE and a serving network via an N3AN according to exemplary embodiments of the solution presented herein.
Figure 6A:
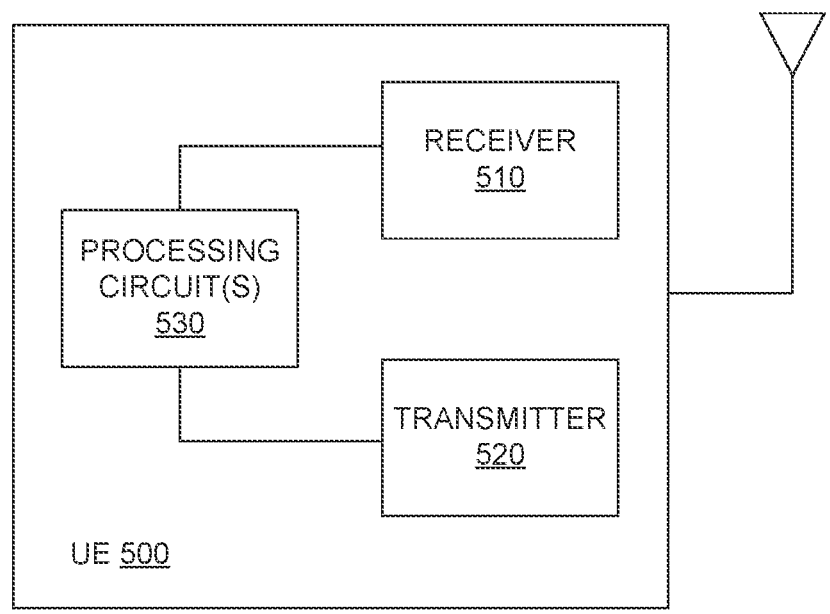
FIG. 6A shows a block diagram of a UE according to exemplary embodiments of the solution presented herein.
Figure 6B:
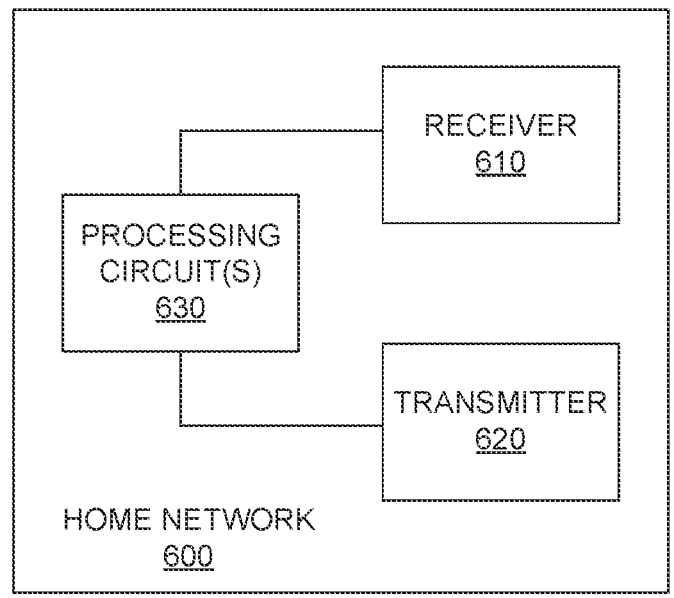
FIG. 6B shows a block diagram of a home network for a UE according to exemplary embodiments of the solution presented herein.
Figure 6C:
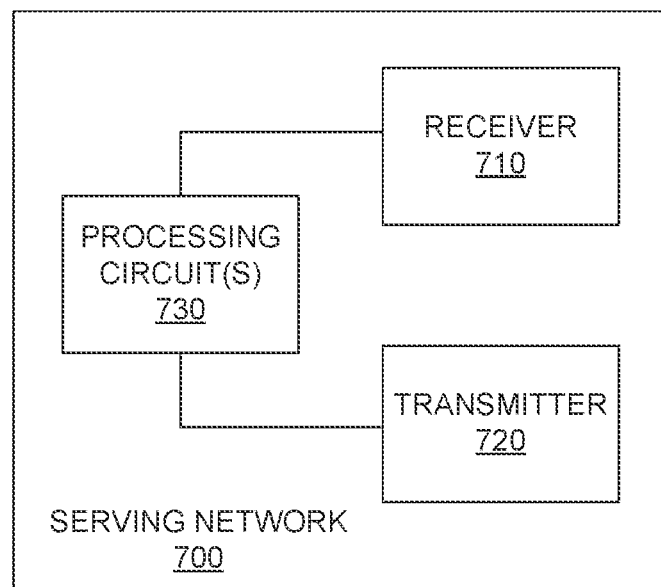
FIG. 6C shows a block diagram of a serving network for a UE according to exemplary embodiments of the solution presented herein.

Before detailing various embodiments of the solution presented herein, the following first more generally describes the solution in cooperation with FIGS. 5A-5C and 6A-6C. FIGS. 5A-5C show exemplary methods for establishing a connection between a UE and a serving network via an N3AN from the perspective of the UE (FIG. 5A), Home Network, e.g., HPLMN (FIG. 5B), and Serving Network, e.g., VPLMN (FIG. 5C). FIGS. 6A-6C show block diagrams for the corresponding apparatus, e.g., UE (FIG. 6A), Home Network (FIG. 6B), and Serving Network (FIG. 6C).

FIG. 5A shows one exemplary method 100 establishing a connection between a UE 500 and a serving network 700 via non-3GPP access network (N3AN). The method 100 is implemented by the UE 500 and comprises, during an initial registration with the serving network 700, using a trusted registration procedure (block 110). The method 100 further comprises receiving a trust indication message from the serving network 700 via the N3AN via a secure access link established by the serving network 700 via the N3AN responsive to the trusted registration procedure (block 120). The trust indication message identifies the N3AN as trusted or untrusted as determined by the serving network 700. When the received trust indication message indicates the N3AN is untrusted (block 130), the method 100 includes executing an untrusted registration procedure with the serving network 700 via the N3AN using the secure access link to establish the connection between the UE 500 and the serving network 700 (block 150). When the received trust indication message indicates the N3AN is trusted (block 130), the method 100 comprises continuing execution of the initial registration with the serving network 700 via the N3AN using the trusted registration procedure to establish the connection between the UE 500 and the serving network 700 (block 140). The method 100 further comprises the UE 500 exchanging messages with the serving network 700 via the established connection (block 160).

FIG. 5B shows one exemplary method 200 of establishing a connection between a UE 500 and a serving network 700 via a non-3GPP access network (N3AN). The method 200 is implemented by a home network 600 of the UE 500 and comprises receiving a trust indication request from the serving network 700 responsive to an initial registration of the UE 500 with the serving network 700 via the N3AN using a trusted registration procedure (block 210). The method 200 further comprises determining whether the N3AN is trusted or untrusted (block 220), and generating a trust indication message identifying whether the N3AN is trusted or untrusted (block 230). The method 200 further comprises sending the trust indication message to the UE 500 via a secure access link established by the serving network 700 via the N3AN responsive to the initial registration to facilitate establishment of the connection between the UE 500 and the serving network 700 (block 240).

FIG. 5C shows one exemplary method 300 of establishing a connection between a UE 500 and a serving network 700 via a non-3GPP access network (N3AN). The method 400 is implemented by a serving network 700 of the UE 500 and comprises, during an initial registration with the serving network 700, using a trusted registration procedure (block 310). The method 300 further comprises sending a trust indication message to the UE 500 via the N3AN using a secure access link established with the UE 500 via the N3AN responsive to the trusted registration procedure (block 320). The trust indication message identifies the N3AN as trusted or untrusted as determined by the serving network 700. When the trust indication message indicates the N3AN is untrusted (block 330), the serving network 700 executes an untrusted registration procedure with the UE 500 via the N3AN using the secure access link to establish the connection between the UE 500 and the serving network 700 (block 350). When the trust indication message indicates the N3AN is trusted (block 330), the serving network 700 continues execution of the initial registration with the UE 500 via the N3AN using the trusted registration procedure to establish the connection between the UE 500 and the serving network 700 (block 340). The method 300 further comprises the serving network 700 exchanging messages with the UE 500 via the established connection (block 360).

In one exemplary embodiment, the serving network further determines whether the N3AN is trusted or untrusted for purposes of establishing the connection between the UE 500 and the serving network 700 via the N3AN. In this embodiment, the serving network 700 sends a trust indication message to a home network 700 of the UE 500 responsive to the initial registration of the UE 500 with the serving network 700 via the N3AN using the trusted registration procedure. The serving network then receives a trust indication from the home network 600 of the UE 500. The received trust indication identified the N3AN as trusted or untrusted. The serving network 700 further sent the trust indication message generated responsive to the received trust indication to the UE 500 via the secure access link.

FIGS. 6A-6C show exemplary block diagrams for the apparatus used for the solution presented herein. FIG. 6A shows a UE 500 comprising a wireless receiver 510, wireless transmitter 520, and one or more processing circuits 530. In conjunction with the receiver 510 and transmitter 520, the processing circuit(s) 530 are configured to execute the method 100 of FIG. 5A. FIG. 6B shows a home network 600 comprising a receiver 610, transmitter 620, and one or more processing circuits 630. In conjunction with the receiver 610 and transmitter 620, the processing circuit(s) 630 are configured to execute the method 200 of FIG. 5B. FIG. 6C shows a serving network 700 comprising a receiver 710, transmitter 720, and one or more processing circuits 730. In conjunction with the receiver 710 and transmitter 720, the processing circuit(s) 730 are configured to execute the method 300 of FIG. 5C. While not expressly shown in FIGS. 6A-6C, it will be appreciated that the processing circuit(s) may comprise any combination of one or more circuits, units, and/or modules, each of which being configured to implement one or more steps of the corresponding method.

Note that the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

Figure 7A:
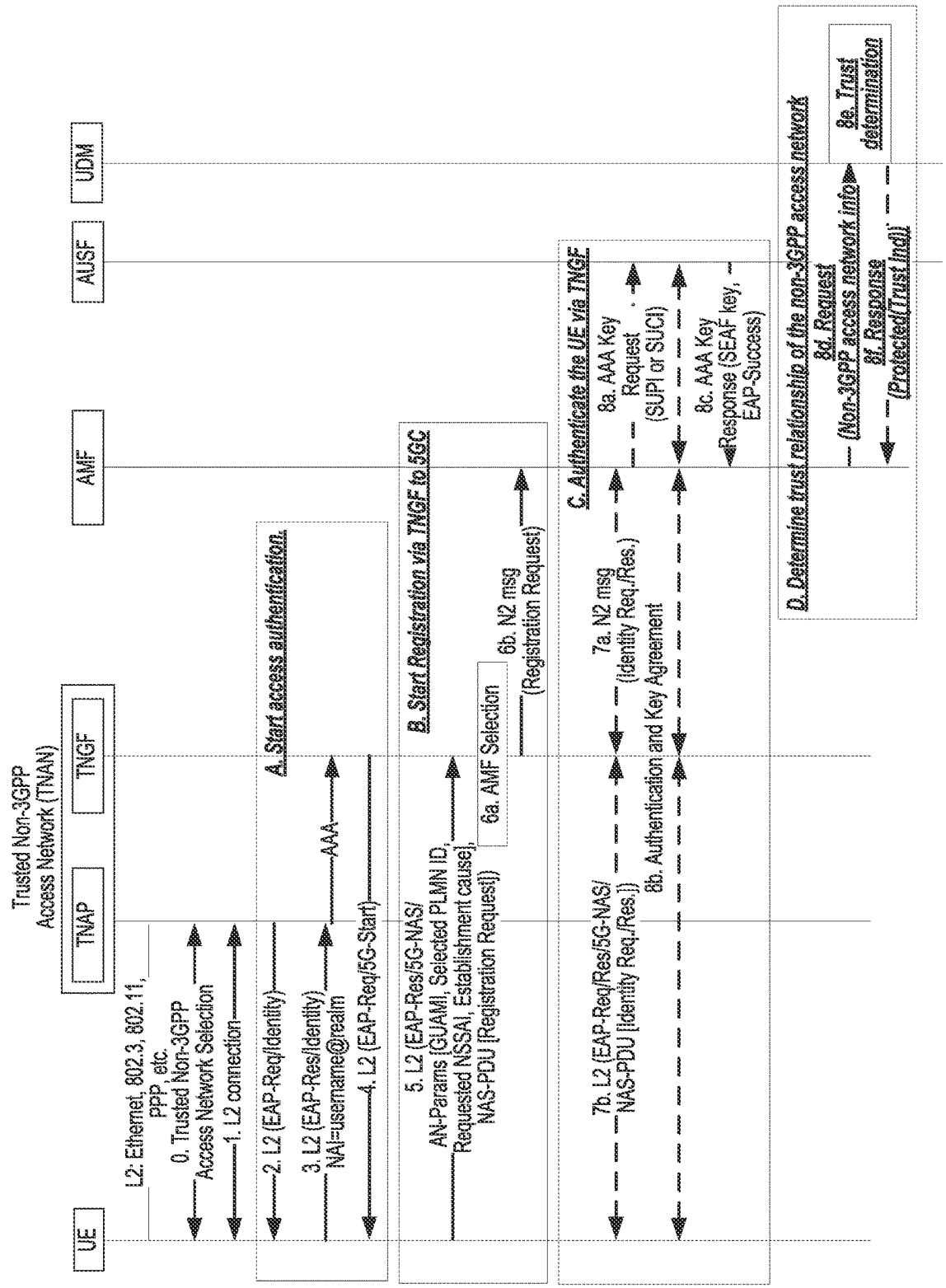
FIGS. 7A-7C show an exemplary process for establishing a connection between a UE and a serving network via an N3AN according to exemplary embodiments of the solution presented herein.
Figure 7B:
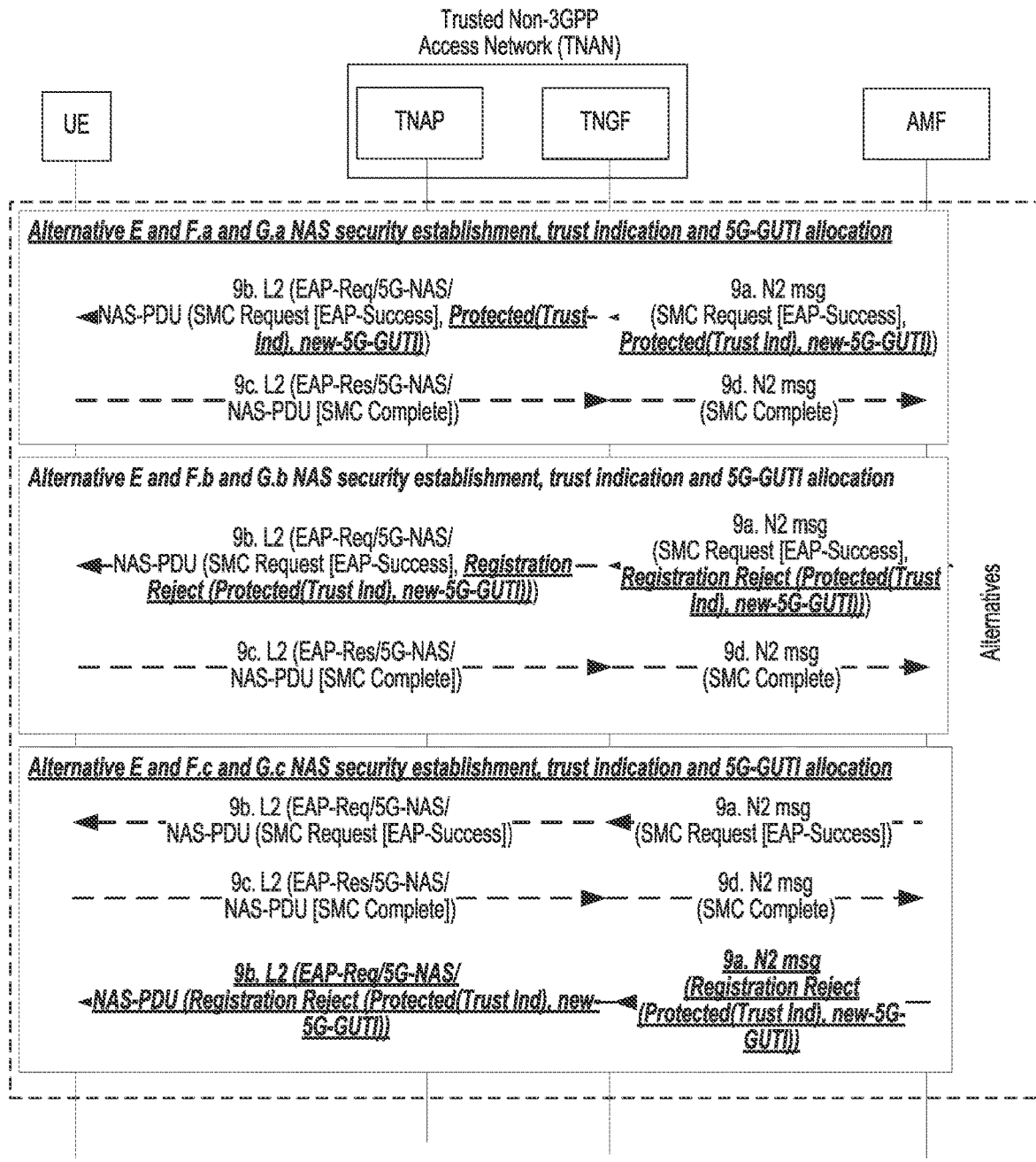
Figure 7C:
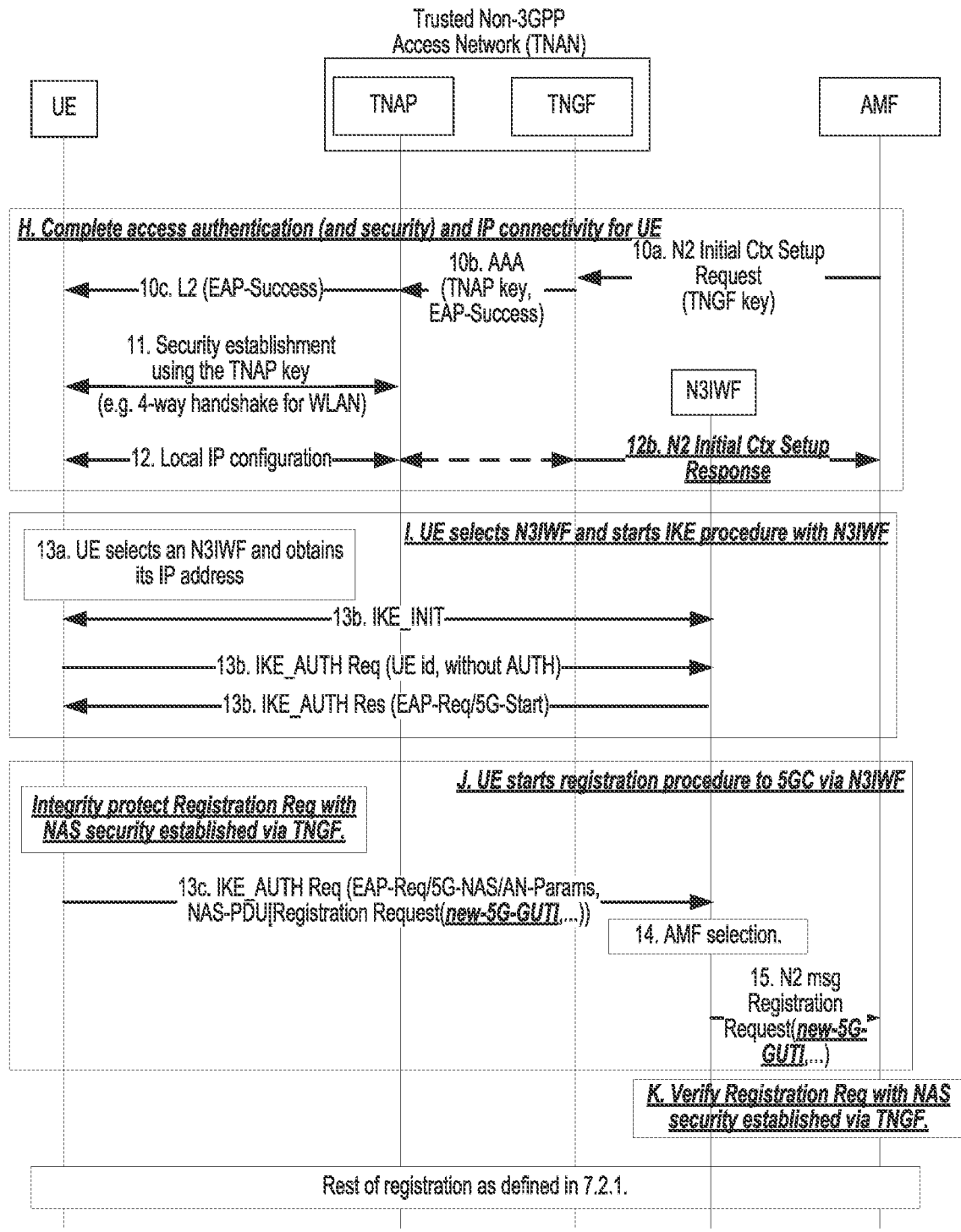

FIGS. 7A-7C show one exemplary embodiment, where FIG. 7B is a continuation of FIG. 7A and FIG. 7C is a continuation of FIG. 7B. The order of steps is not fixed to these. Numbering of the main steps is using capital letters. The numbering of individual steps in FIGS. 7A-7C is mainly from 3GPP SA3-contribution S3-194529 and is illustrative. In FIGS. 7A-7C, bold and italicized text as well as bold, italicized, and underlined text, show the new innovative aspects of the solution presented herein. Different example variants of each step are also described.

Details in parenthesis are steps that take place in the procedure as defined today, but are not explicitly essential for the invention and may not be included with the main embodiment. Precondition steps do not include inventive aspects as such but are important elements of the solution presented herein as a whole.

A. (UE starts access authentication procedures with first access node (e.g., the TNGF) via a non-3GPP access network.)
B. Precondition: UE starts registration procedure to 5GC by sending a registration request via first access node (e.g., TNGF) to the AMF.
C. Precondition: The core network node (e.g., AMF) authenticates the UE. This happens either by running a primary authentication, or if the UE sent an integrity protected registration request, by verifying the integrity protected registration request.
D. The first core network node (e.g., AMF) determines the trust relationship of the non-3GPP access network. This happens
 a. either locally, e.g. by checking local policy of the trust relationship
 b. or by requesting a trust indication from a second core network node (e.g., the Unified Data Management (UDM) network node). In this case, the first core network node (e.g., the AMF) sends information to the second core network node (e.g., UDM) identifying the non-3GPP access network. The second core network node (e.g., UDM) makes the trust relationship decision based on its policy and sends the decision (i.e., the trust indication) to the first core network node (e.g., AMF) in a message integrity protected with a key shared by the home network and the UE, e.g., the Kausf or a key derived from Kausf. This protected trust indication may, for example, be sent in the protected User Parameter Update (UPU) or Steering of Roaming (SoR) message. The protection of the trust relationship is described in P79620.
 c. Alternatively, the first core network node (e.g., AMF) requests a relation of the trusted non-3GPP access networks authorized for the user by the second core network node (e.g., UDM) in the HPLMN, and the determination of the trust relationship of the non-3GPP access network is done by the first core network node (e.g., AMF) (i.e., depending on whether the non-3GPP access network used by the UE is included in the list of trusted non-3GPP access networks authorized for the user by the second core network node (e.g., UDM) or not).
E. Precondition: The first core network node (e.g., AMF) establishes NAS security with the UE. This happens either by running a NAS SMC procedure with the UE or NAS security may be implicitly activated when there is no need to run NAS SMC to activate NAS security. E.g. when receiving an integrity protected registration request from the UE with fresh NAS count.
F. Trust indication. The first core network node (e.g., AMF) sends a protected trust indication to the UE in a protected NAS signaling message. Trust indication may be integrity or confidentiality protected or both. If a trust indication was received from the second core network node (e.g., UDM) (see step 4D,b), then that one is sent to the UE. Alternatives are e.g., (also other messages are possible)
 a. In Security Mode Command
 b. In Registration Reject in SMC
 c. In Registration Reject sent separately.
 d. In Registration Accept. Registration Accept can be sent separately or in SMC.
In another variant, no trust indication is sent from the first core network node (e.g., AMF) to the UE, but the UE may have determined the trust relationship locally, e.g., the UE may have been configured with the trust relationship beforehand.
In yet another variant no trust indication is sent from the first core network node (e.g., AMF) to the UE, but the UE indicates its understanding of the trust relationship of the non-3GPP access network to the first core network node (e.g., AMF), e.g., when sending the registration request. In a further variant, the first core network node can then compare this info received from the UE with the trust relationship information that it has obtained itself (see step D) and if they match, no trust indication is sent to the UE.

G. 5G-GUTI allocation. The first core network node (e.g., AMF) may need to allocate a 5G-GUTI to the UE, e.g. if the UE is authenticated by primary authentication. It may also happen that 5G-GUTI is not allocated, e.g., if the UE and first core network node (e.g., AMF) already have a valid 5G-GUTI from registration via 3GPP access. 5G-GUTI allocation may be integrity or confidentiality protected or both with the NAS security. The UE may then use the allocated 5G-GUTI when sending a registration request via the second access node (e.g., N3IWF) to the first core network node (e.g., AMF). Alternatives for allocation are e.g., (also other messages are possible)
   a. In Security Mode Command
   b. In Registration Reject in SMC
   c. In Registration Reject sent separately.
   d. In Registration Accept. Registration Accept can be sent separately or in SMC.

Note: See figure x for illustrations of some alternatives for steps 5, 6 and 7. Note that also other combinations of sending trust indication and 5G-GUTI allocation in different messages are possible including cases where one of them is not sent or allocated at all.

H. (Access authentication is completed between UE and first access node (e.g., TNGF). IP address is allocated to the UE.)

I. (UE selects the second access node (e.g., N3IWF) and starts IKE procedure with the second access node (e.g., N3IWF).)

J. UE starts registration procedure to 5GC via an untrusted N3AN by sending a registration request via a second access node (e.g., N3IWF) to the first core network node (e.g., AMF). Registration request is protected with NAS security established in step E.

K. The first core network node (e.g., AMF) receives the registration request via the second access node (e.g., N3IWF) and verifies its integrity protection using the NAS security established in step E.

The following lists additional aspects that are related to the invention but are not essential to the main embodiment (not shown in FIGS. 7A-7C).

i. Serving network trust relationship proposal. The serving network (e.g., the first core network node (e.g., AMF)) may indicate its trust relationship proposal of the non-3GPP access network to the second core network node (e.g., UDM). The second core network node (e.g., UDM) may take the trust relationship proposal into account when making the trust relationship decision.

ii. Second access node (e.g., N3IWF) address indication. The first access node (e.g., TNGF) or the first core network node (e.g., AMF) may indicate the address of one or more second access nodes (e.g., N3IWFs) to the UE. If the AMF indicates the second access node (e.g., N3IWF) addresses, this may be done in the SMC, or Registration Reject or Registration Accept messages, or in some other message. The second access node (e.g., N3IWF) address indication may be integrity or confidentiality protected or both with the NAS security key. The UE may take the indicated second access node (e.g., N3IWF) address into account when starting the registration procedure in via a second access node (e.g., N3IWF) to the 5GC. If the first access node (e.g., TNGF) indicates the second access node (e.g., N3IWF) addresses, this may be sent together with a NAS signaling message from the first access node (e.g., TNGF) to the UE.

iii. Indication of type of connectivity to the first access node (e.g., TNGF). The first core network node (e.g., AMF) may indicate the type of connectivity to the first access node (e.g., TNGF) when the trust decision is untrusted access. The first access node (e.g., TNGF) can take this into account and not to expect an IPsec tunnel to be established by the UE but only IP connectivity, and the first access node (e.g., TNGF) knows to send one or more second access network node (e.g., N3IWF) addresses to the UE instead of the first access node (e.g., TNGF) address, and the first access node (e.g., TNGF) knows to send N2 Initial Context Response to the first core network node (e.g., AMF) when an IP address is allocated to the UE.

iv. Timer for registration. The first core network node (e.g., AMF) may start a timer when the procedures via the first access node (e.g., TNGF) are completed, e.g. when a N2 Initial Context Response is received. The first core network node (e.g., AMF) may stop the timer when a registration request from the UE via a second access network node (e.g., N3IWF) is received. The purpose of the timer is to avoid hanging resources if the UE never sends the registration request via a second access network node (e.g., N3IWF).

The following provides a set of example embodiments which illustrate some specific variants from the embodiment of FIGS. 7A-7C.

Figure 8A:
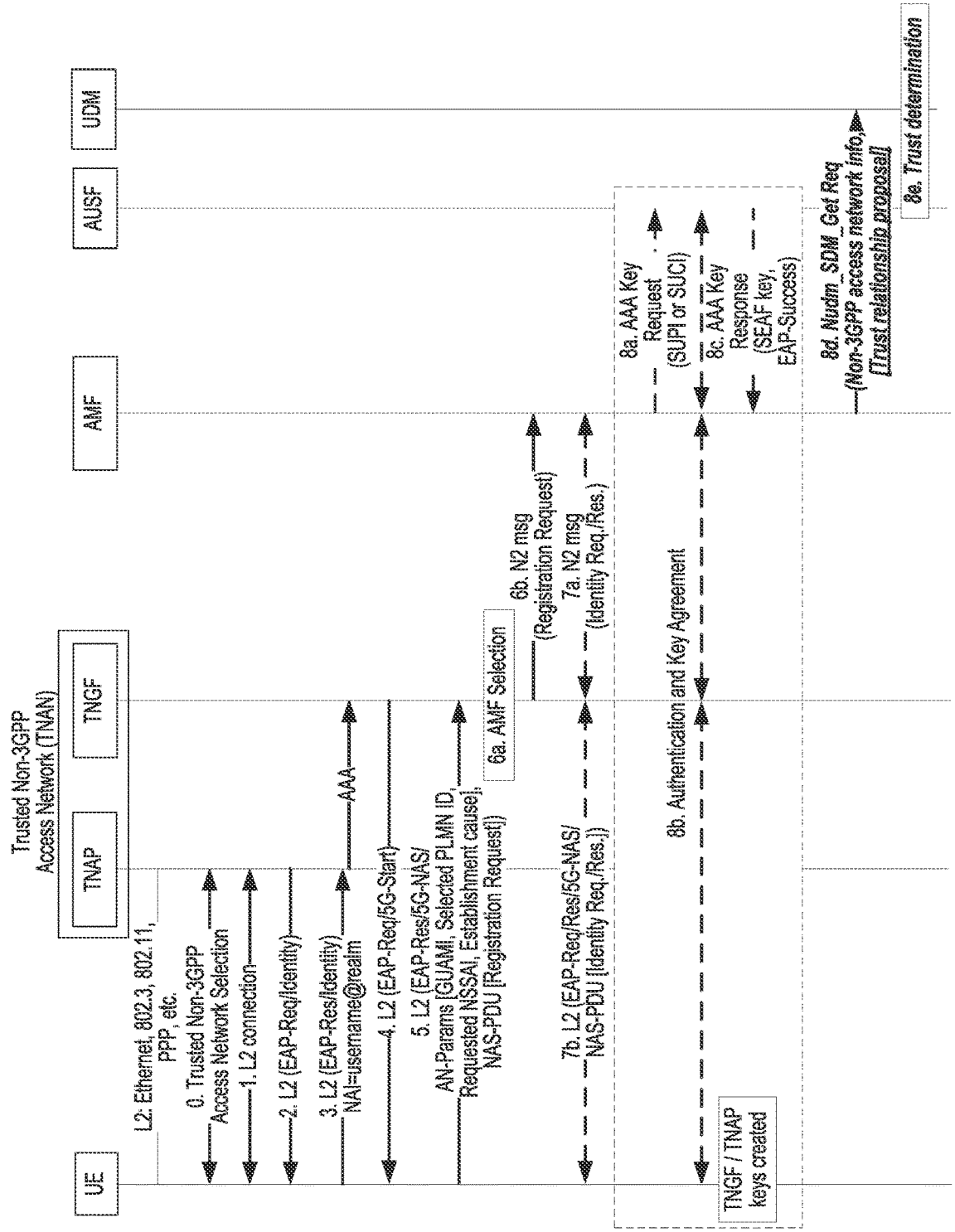
FIGS. 8A-8C show an exemplary process for establishing a connection between a UE and a serving network via an N3AN according to exemplary embodiments of the solution presented herein.
Figure 8B:
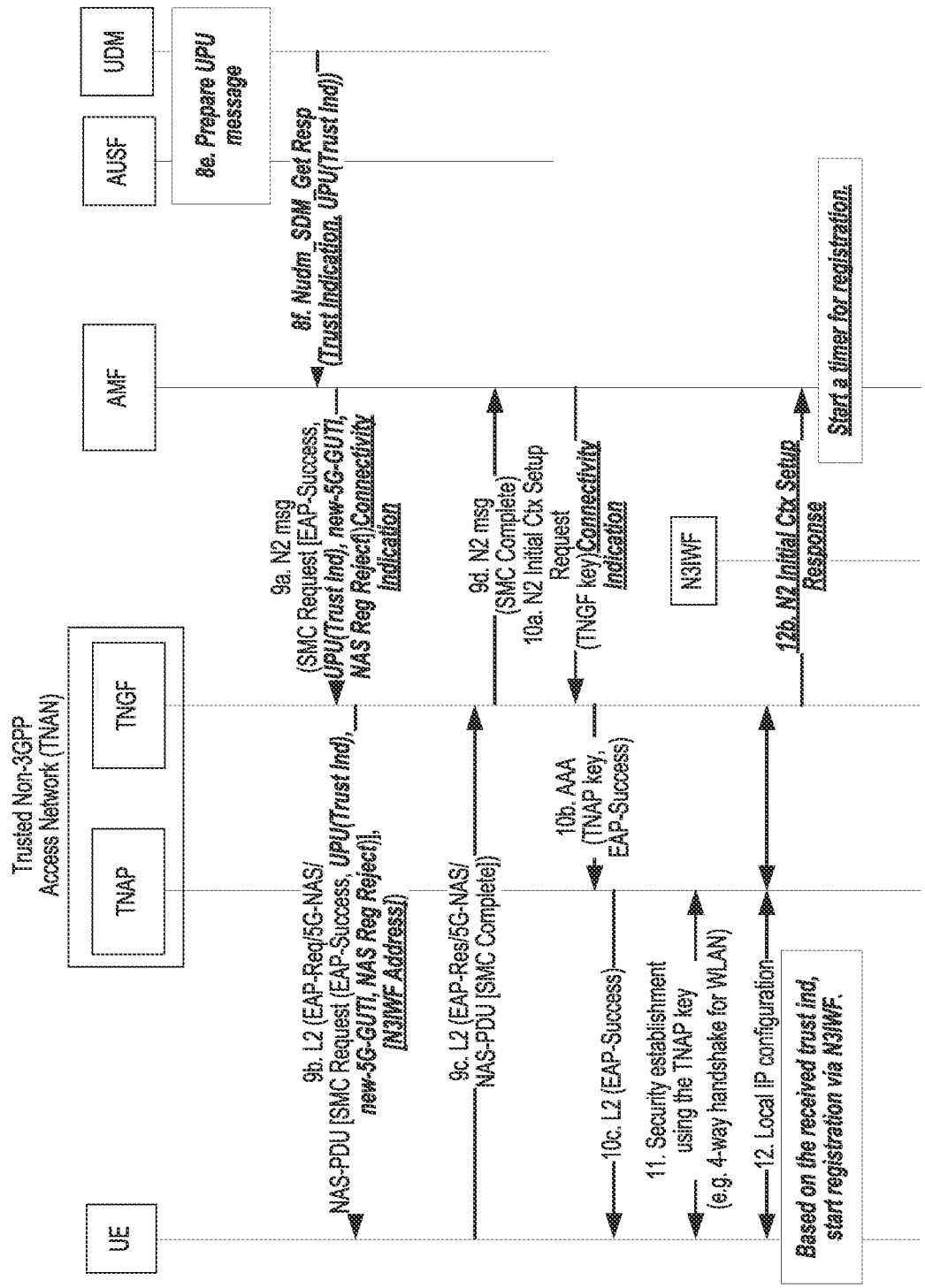
Figure 8C:
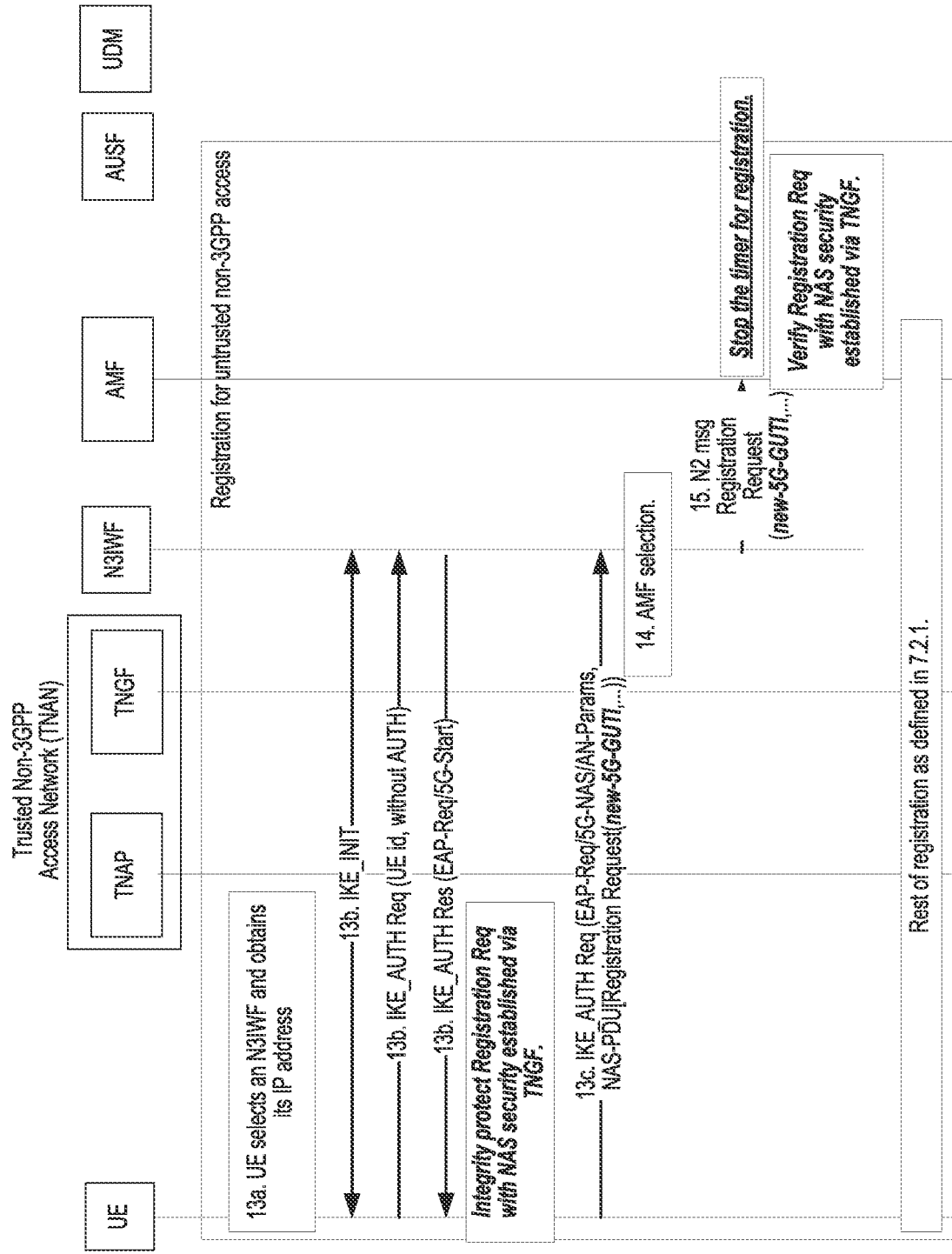

FIGS. 8A-8C below shows a specific collection of embodiments from the main embodiment, where FIG. 8B is a continuation of FIG. 8A and FIG. 8C is a continuation of FIG. 8B. The baseline text is from 3GPP SA3-contribution S3-194529, while bolded and italicized text shows the new aspects from FIGS. 7A-7C, and bold, italicized, and underlined text shows additional inventive aspects. It should be noted that all the additional inventive aspects above (i to iv) may also apply to other embodiments, and that they are only illustrated in this embodiment as an example.

0-8c. Steps 0-8c from clause 7A.b.x for authentication of 3GPP SA3-contribution S3-194529 via trusted non-3GPP access are performed with the following modifications: Regardless if the current configuration in the UE indicates the non-3GPP access network to be trusted or untrusted, the UE starts registration procedure as it would be a trusted non-3GPP access network The AMF determines the trust relationship of the non-3GPP access network. According to one embodiment of this IvD, the AMF may do this locally, e.g. by checking local policy of the trust relationship.

Alternatively, the AMF may contact the UDM according to the embodiments described in steps 8d-8f. 8d. After the AMF has successfully authenticated the UE (i.e. by successfully verifying an integrity protected Registration Request message or performing a primary authentication procedure and receiving Nausf_UEAuthentication_Authenticate Response including $K_{SEAF}$) the AMF sends Nudm_SDM_Get request to the UDM, where "Nudm" refers to the service0based interface exhibited by UDM.

In one embodiment of this step, the AMF may indicate the access technology and identity of the non-3GPP access network via which the UE is attempting to register. The AMF may include its policy on the non-3GPP access network trust relationship.

In an alternative embodiment of this step, the AMF may only request the list of trusted non-3GPP access networks authorized by the UDM for that UE.

8e Upon receiving the Nudm_SDM_Get request, and according to the first embodiment of step 8d, the UDM determines the trust relationship of the non-3GPP access network based on the access technology and identity of the access network and, in case of roaming, the identity of the VPLMN. The UDM may take the VPLMN's policy and capability returned from the AMF or roaming agreement into account. The UDM then prepares a protected UE Parameters Update (UPU) Data message as defined in clause 6.15.2.1 indicating the determined trust relationship which in this case indicates untrusted non-3GPP access network.

8f. According to the first embodiment of step 8d, in the Nudm_SDM_Get response the UDM indicates the determined trust relationship to the AMF and includes the UPU message indicating the determined trust relationship.

Alternatively, and according to the second embodiment of step 8d, the UDM provides to the AMF the list of trusted non-3GPP access networks authorized by the UDM for that UE. In this case, the AMF determines the trust relationship of the non-3GPP access network used by the UE depending on whether it is included in the list of trusted non-3GPP access networks authorized for the user received from the UDM or not).

9a. The AMF and UE performs a Security Mode Command (SMC) procedure as defined in 7A.b.x steps 9a-9d with the following modifications:

9a. The AMF allocates a new 5G-GUTI to the UE. The AMF includes the new 5G-GUTI and the trust indication in the SMC. The trust indication may be included within a UPU container if received like that from the UDM according to the first embodiment of steps 8d-8f. Otherwise the Trust indication is included as determined by the AMF (e.g. using local policies or information from the UDM). The AMF also includes a Registration Reject message with a cause value indicating that the access is considered an untrusted non-3GPP access.

9a. When sending the SMC message to the TNGF, the AMF indicates to the TNGF that the connectivity is only IP connectivity for the UE. In the L2 message to the UE the TNGF may include the address of an N3IWF to which registration signalling via an untrusted non-3GPP access should be sent. The TNGF address is not sent.

9b. Upon receiving the SMC including a Registration Reject with a cause value indicating that the access is considered an untrusted non-3GPP access, the UE stores the received trust relationship, new 5G-GUTI, and N3IWF address (if received). If the AMF included the trust indication within an UPU container, the UE verifies the validity of the UPU Data message as defined in clause 6.15.2.1 indicating the trust relationship before storing the received trust relationship. In case of unsuccessful verification of the UPU container or if the trust relationship indicates untrusted non-3GPP access and Registration Reject message was received, the UE aborts the registration procedure.

10a. Upon receiving the SMC Complete message the AMF sends N2 Initial Context set-up as defined in 7A.b.x step 10a with the following modifications:

The AMF indicates to the TNGF that the connectivity is only IP connectivity for the UE for untrusted non-3GPP access network.

10b-c. The TNGF sends the TNAP key to the TNAP and EAP-5G level EAP Success as defined in steps in 7A.b.x steps 10b-10c.

11-12. The UE and TNAP establish security using TNAP key and local IP address is allocated to the UE as defined in 7A.b.x steps 11-12.

12b. The TNGF sends the N2 Initial Context Setup Response to the AMF indicating that IP connectivity is established for the UE.

13. Upon receiving IP connectivity the UE starts the registration procedure via the N3IWF as defined in clause 7.2.1 with the following modifications:

13a. the UE selects an N3IWF and obtains its IP address. If the UE received the N3IWF address in step 9b it may take the received N3IWF address into account.

13b. UE and N3IWF start IKE and EAP-5G as defined in clause 7.2.1.

13c. the UE uses the new-5G-GUTI received in the SMC as its identity in the registration request message. The UE integrity protects the registration request message with the NAS security context which was activated in steps 9a-d.

14. N3IWF selects the AMF with the help of new-5G-GUTI.

15. AMF uses the received new-5G-GUTI to find the UE NAS security context in order verify the integrity of the registration request and thereby authenticate the UE.

Figure 9A:
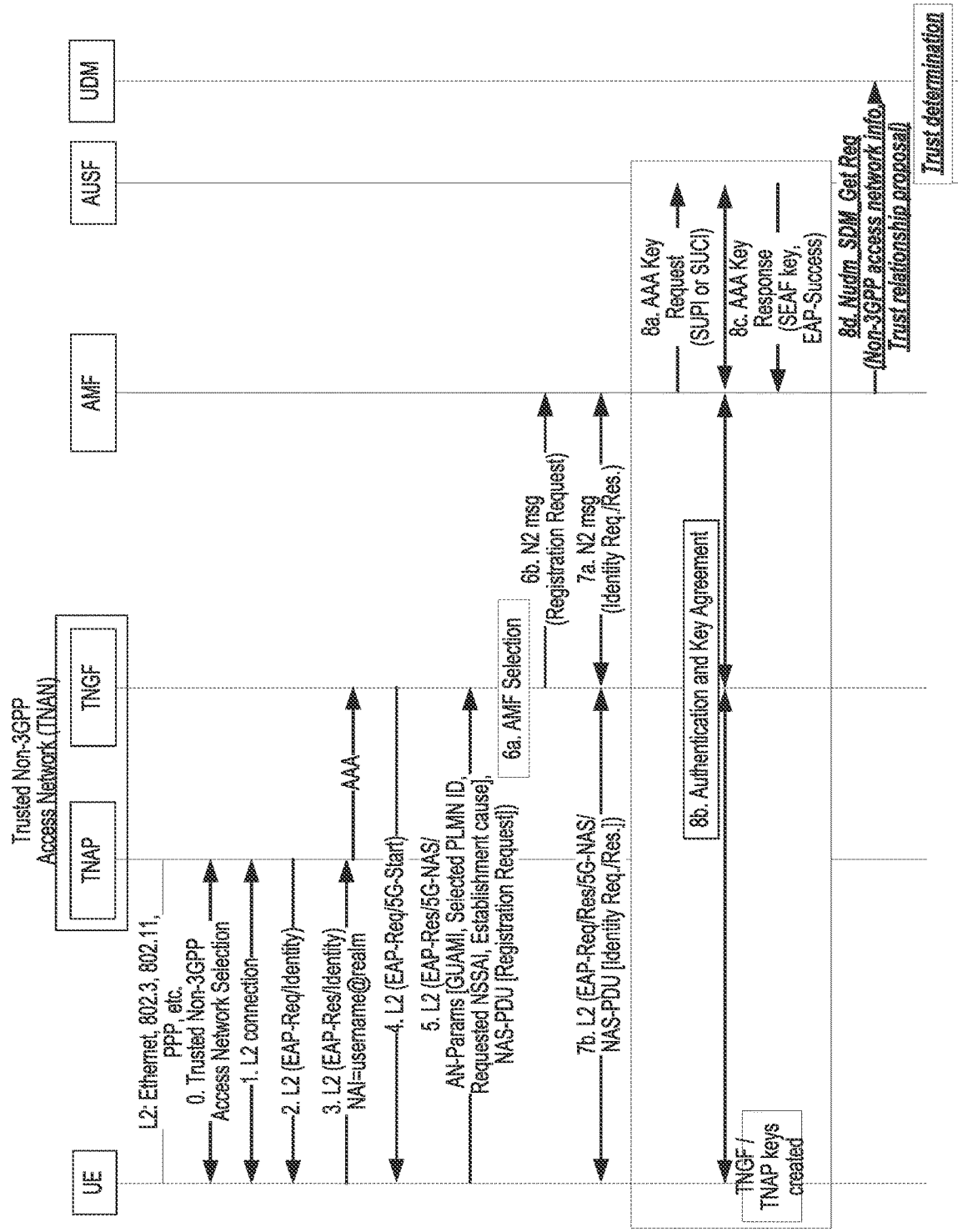
FIGS. 9A-9B show an exemplary process for establishing a connection between a UE and a serving network via an N3AN according to exemplary embodiments of the solution presented herein.
Figure 9B:
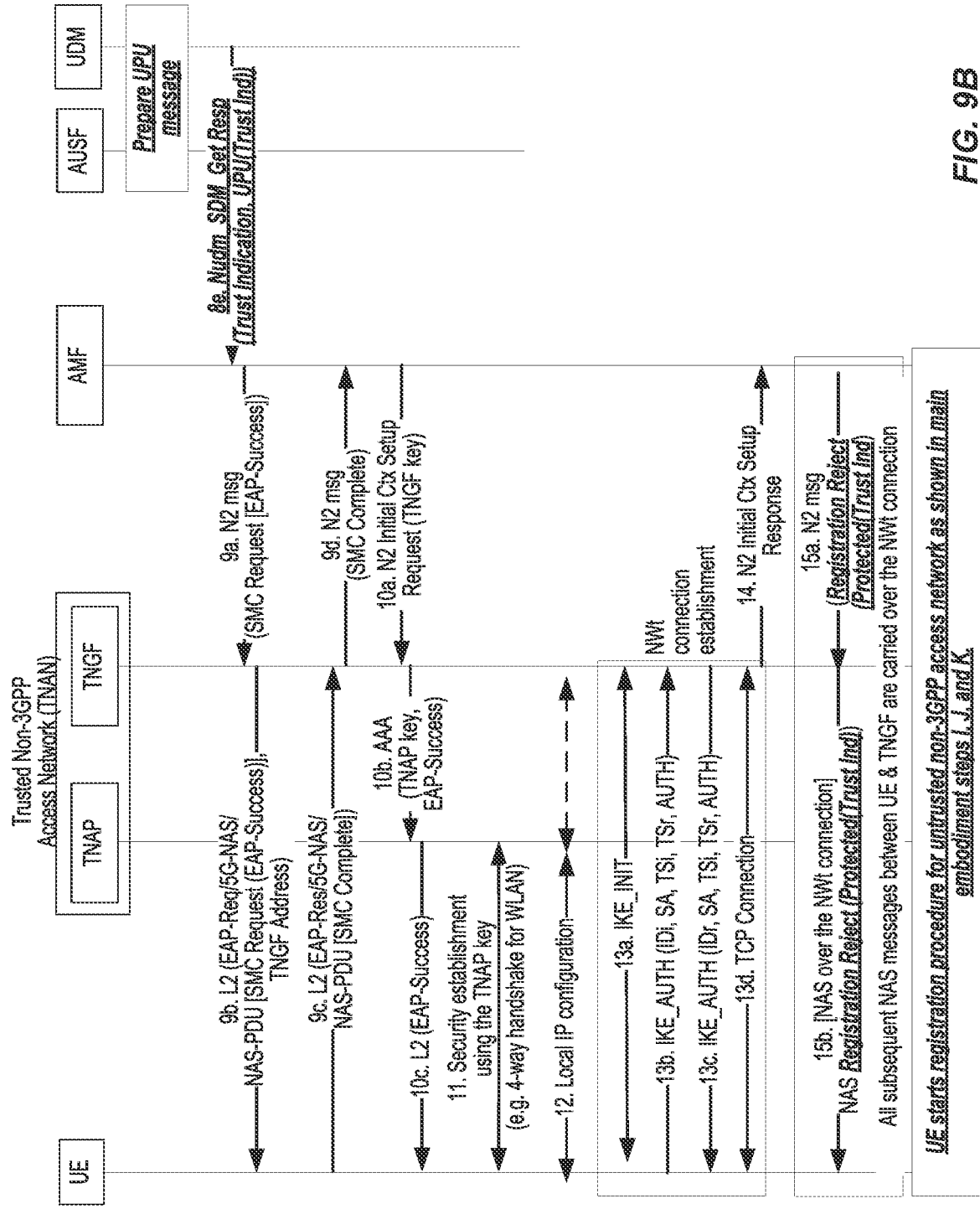

In another exemplary embodiment, the trust relationship is indicated to the UE after IPsec tunnel is established with the TNGF. In this embodiment, the trust indication is sent in Registration Reject after the IPsec tunnel is established with the TNGF. This is a variant of the F.c part of the embodiment discussed above, but the trust indication is in practice sent later. The other aspects from the embodiment discussed above apply, e.g., for step D trust determination, step G 5G-GUTI allocation, and additional aspects i-iv. See FIGS. 9A-9B, where FIG. 9B is a continuation of FIG. 9A.

In another exemplary embodiment, the UE runs a new authentication via the N3IWF. In this embodiment, the UE does not reuse the NAS security established during the 3GPP-based access authentication for registering to 5GC via the N3IWF, but the UE starts with a new primary authentication by sending the SUCI (or SUPI) in the registration request. The UE still sets up L2 security with the AP and acquires IP address from AP in order to get IP connectivity.

Figure 10A:
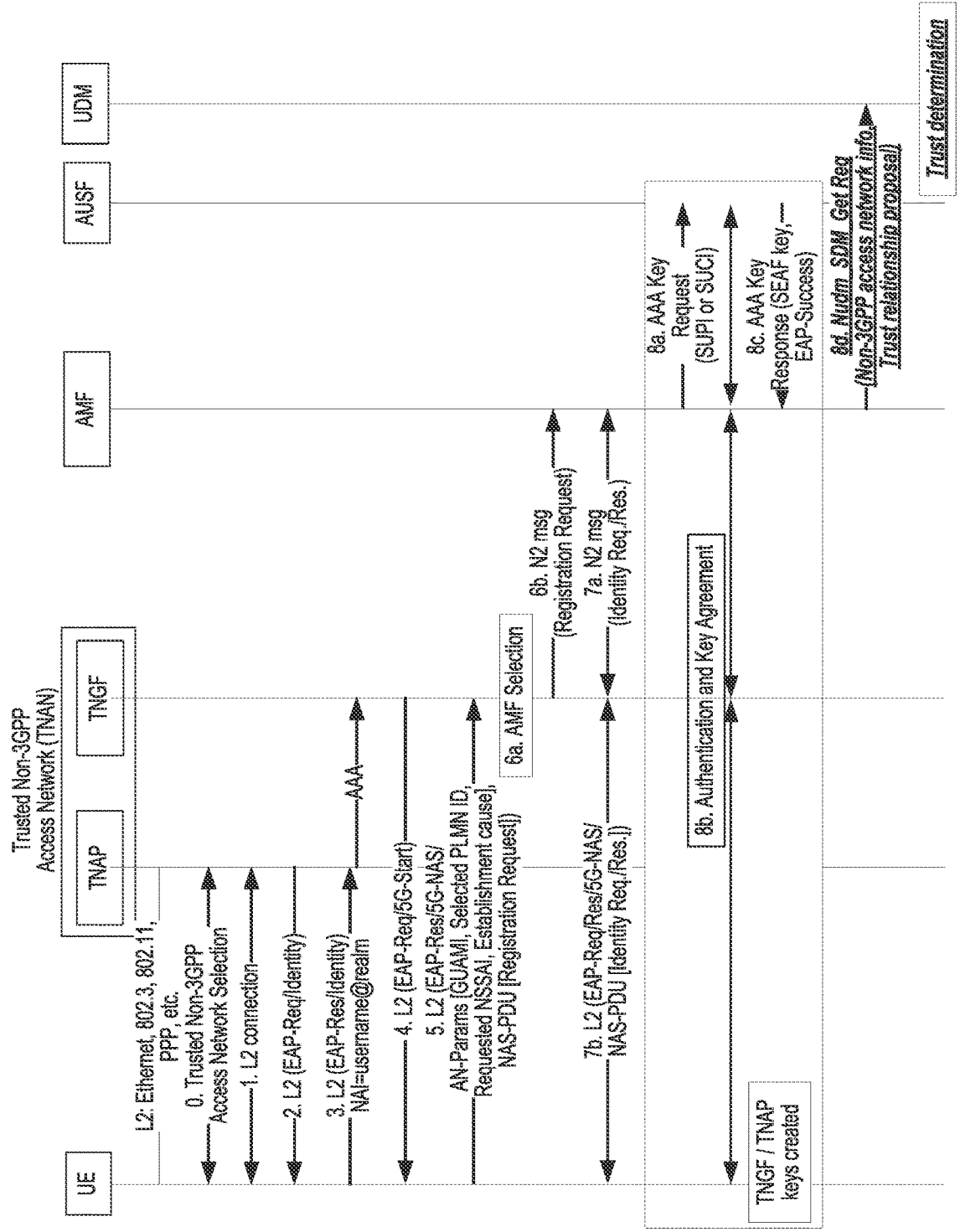
FIGS. 10A-10B show an exemplary process for establishing a connection between a UE and a serving network via an N3AN according to exemplary embodiments of the solution presented herein.
Figure 10B:
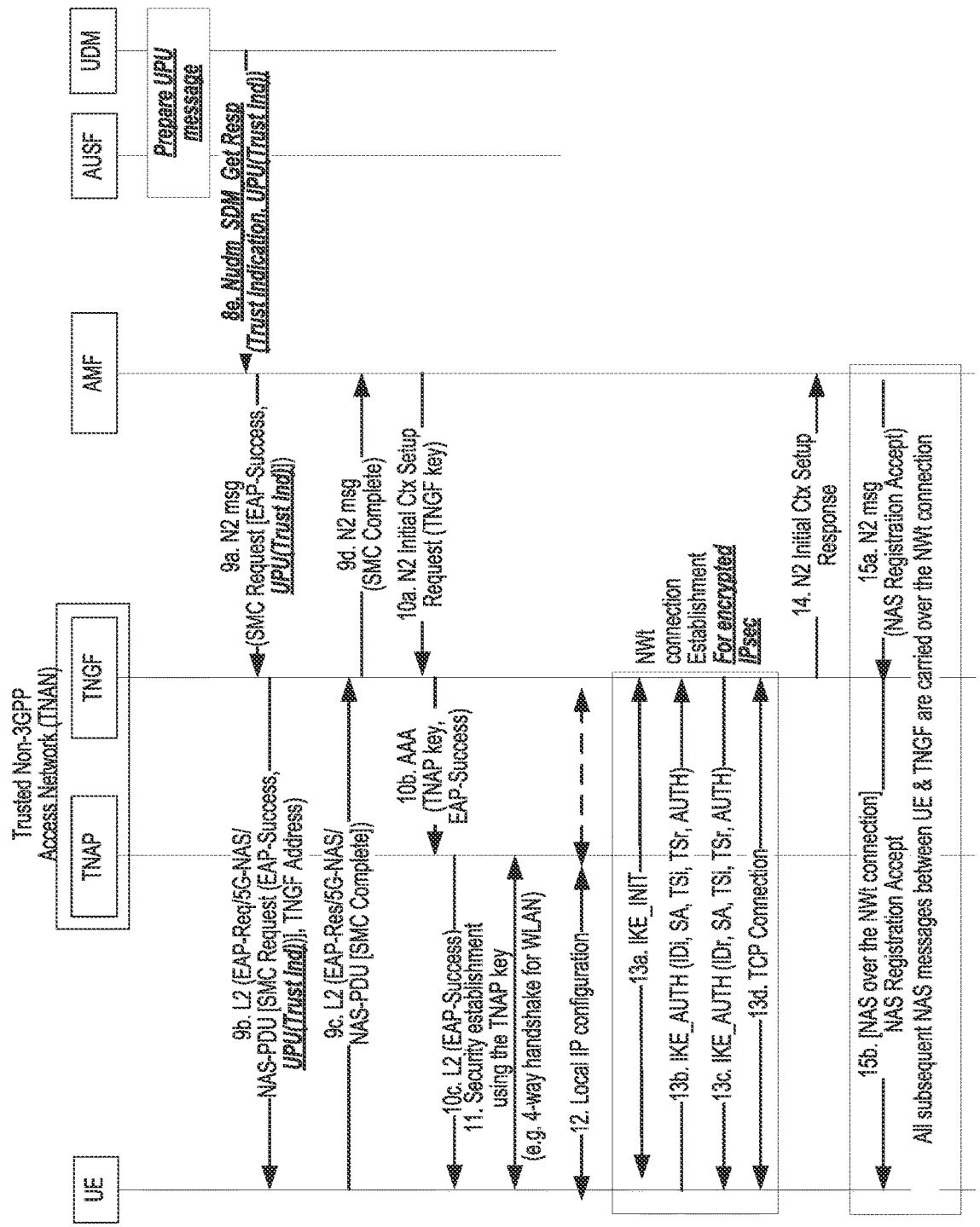

In one exemplary embodiment, an encrypted tunnel to the TNGF is set up when the non-3GPP access network is considered untrusted. This is an embodiment for the case when an encrypted IPsec tunnel is not established between the UE and the N3IWF even though the non-3GPP access network is considered untrusted. Instead, an encrypted IPsec tunnel is established between the UE and the TNGF. See FIGS. 10A-10B, where FIG. 10B is a continuation of FIG. 10A.

Additional embodiments address scenarios where the trust indication indicates a trusted N3AN.

One exemplary embodiment shows an alternative to how the trust indication could be used to indicate a trusted non-3GPP access network. The baseline text is from 3GPP SA3-contribution S3-194529 and bold, italicized, and or underlined text shows the new aspects. It should be noted that the shown trust indication is just an example and considerations from main embodiment step D apply.

The 7A.b.x Authentication for Trusted non-3GPP Access clause specifies how a UE is authenticated to 5G network via a trusted non-3GPP access network. This is based on the specified procedure in TS 23.502 v. 16.2.0 clause 4.12a.2.2 "Registration procedure for trusted non-3GPP access". The authentication procedure is similar to the authentication procedure for trusted non-3GPP access defined in clause 7.2.1 with differences that are mentioned below, e.g., with respect to FIGS. 11A-11B.

Figure 11A:
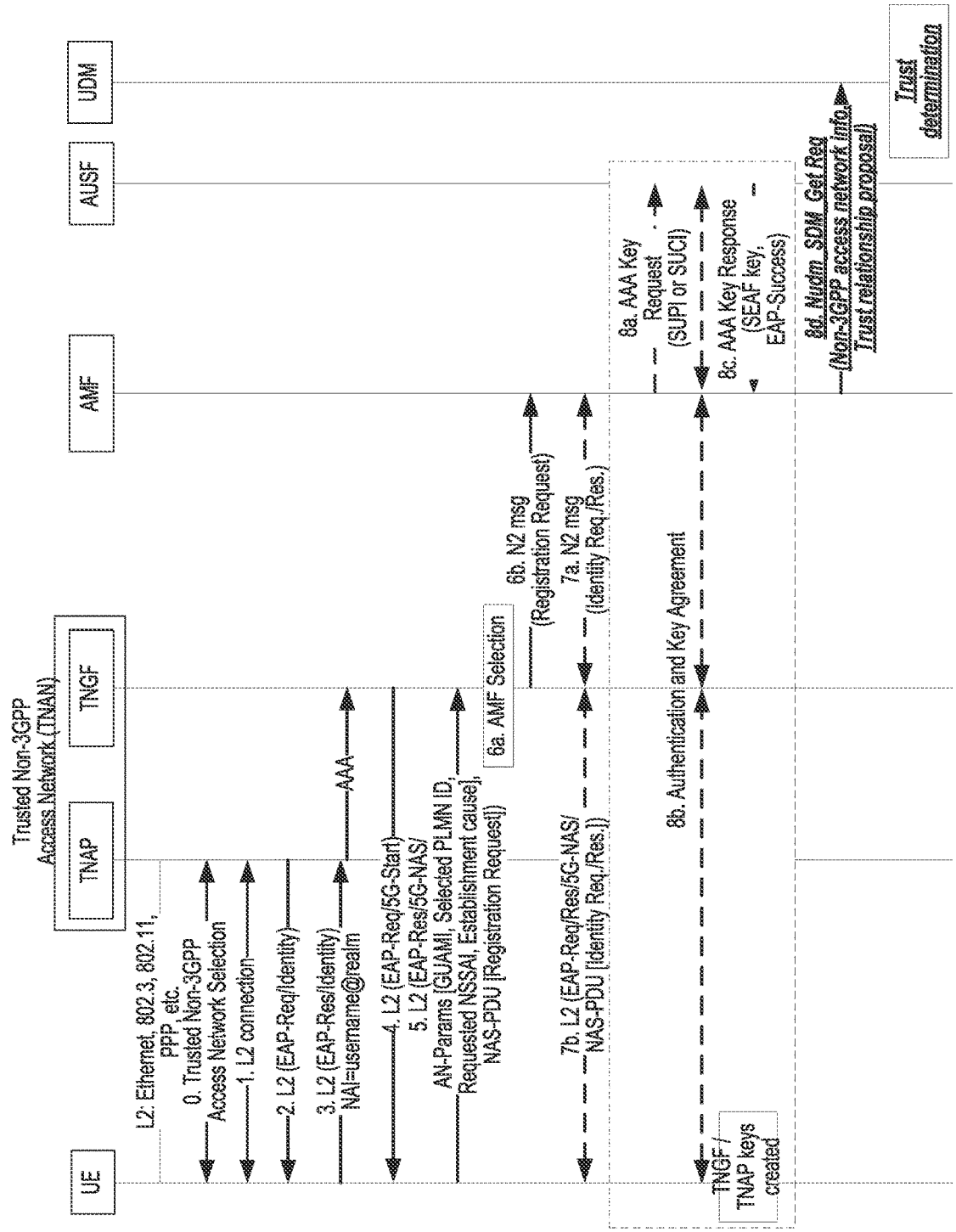
FIGS. 11A-11B show an exemplary process for establishing a connection between a UE and a serving network via an N3AN according to exemplary embodiments of the solution presented herein.
Figure 11B:
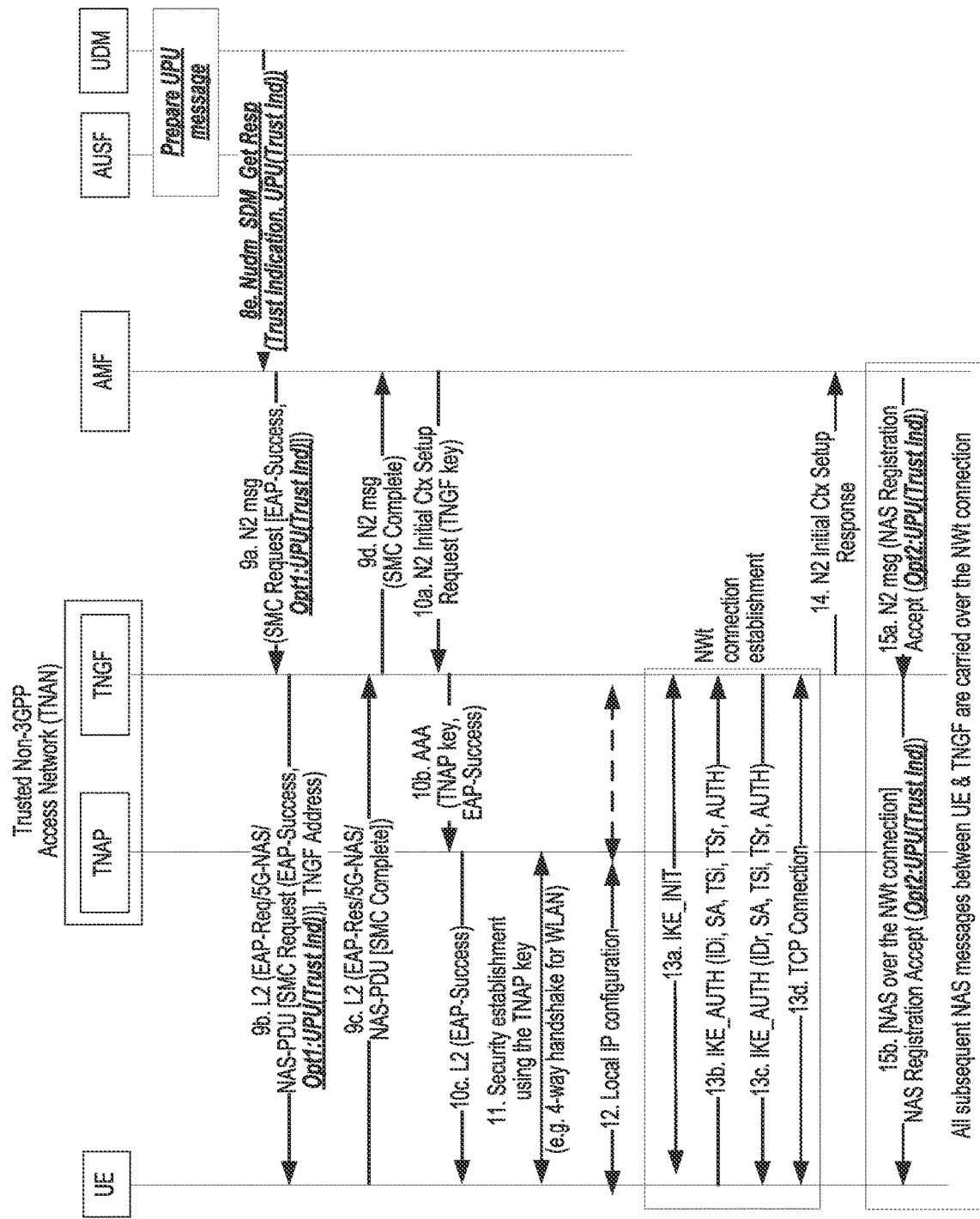

FIGS. 11A-11B show registration/authentication and PDU session establishment for trusted non-3GPP access, where FIG. 11B is a continuation of FIG. 11A, according to one exemplary embodiment.

0. The UE selects a PLMN and a TNAN for connecting to this PLMN by using the Trusted Non-3GPP Access Network selection procedure specified in TS 23.501 v. 16.2.0 clause 6.3.12. During this procedure, the UE discovers the PLMNs with which the TNAN supports trusted connectivity (e.g. "5G connectivity").

1. A layer-2 connection is established between the UE and the TNAP. In case of IEEE 802.11, this step corresponds to an 802.11 Association. In case of PPP, this step corresponds to a PPP LCP negotiation. In other types of non-3GPP access (e.g. Ethernet), this step may not be required.

2-3. An EAP authentication procedure is initiated. EAP messages are encapsulated into layer-2 packets, e.g. into IEEE 802.3/802.1x packets, into IEEE 802.11/802.1x packets, into PPP packets, etc. The UE provides a NAI that triggers the TNAP to send an AAA request to a TNGF. Between the TNAP and TNGF the EAP packets are encapsulated into AAA messages.

4-10. An EAP-5G procedure is executed as specified in clause 7.2.1 with the following modifications:

The EAP-5G packets are not encapsulated into IKEv2 packets.

The AMF determines the trust relationship of the non-3GPP access network in the following way. It will be appreciated that the same alternative embodiments as included with the untrusted embodiments also apply here (e.g., locally configured information at the AMF, trust indication provided by the UDM, trust indication based on information received from UDM, etc.)

8d. After the AMF has successfully authenticated the UE (i.e. by successfully verifying an integrity protected Registration Request message or performing a primary authentication procedure and receiving Nausf_UEAuthentication_Authenticate Response including $K_{SEAF}$) the AMF sends Nudm_SDM_Get request to the UDM which indicates the access technology and identity of the non-3GPP access network via which the UE is attempting to register. The AMF may include its policy on the non-3GPP access network trust relationship.

8e. Upon receiving the Nudm_SDM_Get request, the UDM determines the trust relationship of the non-3GPP access network based on the access technology and identity of the access network and, in case of roaming, the identity of the VPLMN. The UDM may take the VPLMN's policy and capability returned from the AMF or roaming agreement into account. The UDM then prepares a protected UPU data message as defined in clause 6.15.2.1 indicating the determined trust relationship which in this case indicates trusted non-3GPP access network.

8f. In the Nudm_SDM_Get response the UDM indicates the determined trust relationship to the AMF and include the UPU message indicating the determined trust relationship.

[Option 1]: The AMF and UE performs Security Mode Command (SMC) procedure as defined in 7.2.1 steps 9a-9d with the following modifications:

9b. The AMF includes the UPU message received from the UDM indicating trusted non-3GPP access network in the SMC.

9c. Upon receiving the SMC the UE verifies the validity of the UPU message as defined in clause 6.15.2.1 indicating the trust relationship. In case of successful verification and if the UPU message indicates trusted non-3GPP access, UE stores the received trust relationship. In case of unsuccessful verification or if the UPU message indicates untrusted non-3GPP access, the UE aborts the registration procedure.

A $K_{TNGF}$ as specified in clause Annex A.9 (equivalent to $K_{N3/WF}$) is created in the UE and in the AMF after the successful authentication. The $K_{TNGF}$ is transferred from the AMF to TNGF in step 10a (within the N2 Initial Context Setup Request).

The TNAP is a trusted entity. The TNGF generates the $K_{TNAP}$ and transfers it from TNGF to TNAP in step 10b (within an AAA message). The $K_{TNAP}$ depends on the non-3GPP access technology, e.g. it is a Pairwise Master Key in the case of IEEE 802.11) and can be derived from the TNGF key, e.g. by using the first 32 bytes of the TNGF key.

In step 9b the UE receives the "TNGF Contact Info" which includes the IP Address of TNGF to which NAS signalling should be sent.

11. The common TNAP key is used by the UE and TNAP to derive security keys according to the applied non-3GPP technology and to establish a security association to protect all subsequent traffic. In case of IEEE 802.11, the $K_{TNAP}$ is the Pairwise Master Key (PMK) and a 4-way handshake is executed (see IEEE 802.11) which establishes a security context between the WLAN AP and the UE that is used to protect unicast and multicast traffic over the air. All messages between UE and TNAP are encrypted and integrity protected from this step onwards.

NOTE: whether step 11 is performed out of the scope of this specification. The current procedure assumes the encryption protection over Layer-2 between UE and TNAP is to be enabled.

12. The UE receives IP configuration from the TNAN, e.g. with DHCP.

13. The UE initiates an IKE_INIT exchange with the TNGF. The UE has received the IP address of TNGF during the EAP-5G signalling in step 9b, subsequently, the UE initiates an IKE_AUTH exchange and provides its SUPI or 5G-GUTI identity. The common $K_{TNGF}$ is used for mutual authentication. NULL encryption is negotiated as specified in RFC 2410. After step 13c, an IPsec SA is established between the UE and TNGF (i.e. a NWt connection) and it is used to transfer all subsequent NAS messages. This IPsec SA does not apply encryption but only apply integrity protection.

14. After the NWt connection is successfully established, the TNGF responds to AMF with an N2 Initial Context Setup Response message.

15. Finally, the NAS Registration Accept message is sent by the AMF and is forwarded to UE via the established NWt connection.

[Option 2]: The AMF includes the UPU message received from the UDM indicating trusted non-3GPP access network in the SMC. Upon receiving the SMC the UE verifies the validity of the UPU message as defined in clause 6.15.2.1 indicating the trust relationship. In case of successful verification and if the UPU message indicates trusted non-3GPP access, UE stores the received trust relationship. In case of unsuccessful verification or if the UPU message indicates untrusted non-3GPP access, the UE aborts the registration procedure. If the AMF determines the trust relationship itself, the UPU is not used.

16-18. The UE initiates a PDU session establishment. This is carried out exactly as specified in TS 23.502 v. 16.2.0 clause 4.12a.5. The TNGF may establish one or more IPsec child SA's per PDU session.

19. User plane data for the established PDU session is transported between the UE and TNGF inside the established IPsec child SA.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. A method of establishing a connection between a User Equipment (UE) and a serving network via a Non-3GPP Access Network (N3AN) the method implemented by the UE and comprising:
during an initial registration with the serving network, using a trusted registration procedure for trusted non-3GPP access;
receiving, via a Trusted Non-3GPP Gateway Function (TNGF), a trust indication message from the serving network via the N3AN using a secure access link established by the serving network via the N3AN responsive to the trusted registration procedure, said trust indication message identifying the N3AN as trusted or untrusted as determined by the serving network;
when the received trust indication message indicates the N3AN is untrusted, executing an untrusted registration procedure with the serving network via the N3AN using the secure access link to establish the connection between the UE and the serving network;
when the received trust indication message indicates the N3AN is trusted, continuing execution of the initial registration with the serving network via the N3AN using the trusted registration procedure to establish the connection between the UE and the serving network; and
exchanging messages with the serving network via the established connection.

2. The method of claim 1 wherein receiving the trust indication message comprises receiving the trust indication message in a security mode command from the serving network via the N3AN using the secure access link established by the serving network.

3. The method of claim 1 wherein receiving the trust indication message comprises receiving the trust indication message in a registration reject message from the serving network via the N3AN using the secure access link established by the serving network.

4. A User Equipment (UE) configured to establish a connection with a serving network via a non-3GPP access network (N3AN) the UE comprising one or more processing circuits configured to: during an initial registration with the serving network, use a trusted registration procedure for trusted non-3GPP access;
receive, via a Trusted Non-3GPP Gateway Function (TNGF), a trust indication message from the serving network via the N3AN using a secure access link established by the serving network via the N3AN responsive to the trusted registration procedure, said trust indication message identifying the N3AN as trusted or untrusted as determined by the serving network;
when the received trust indication message indicates the N3AN is untrusted, execute an untrusted registration procedure with the serving network via the N3AN using the secure access link to establish the connection between the UE and the serving network;
when the received trust indication message indicates the N3AN is trusted, continue execution of the initial registration with the serving network via the N3AN using the trusted registration procedure to establish the connection between the UE and the serving network; and
exchange messages with the serving network via the established connection.

5. A method of establishing a connection between a User Equipment (UE) and a serving network via a Non-3GPP Access Network (N3AN) the method implemented by a home network of the UE and comprising:
receiving a trust indication request from the serving network responsive to an initial registration of the UE with the serving network via the N3AN using a trusted registration procedure;
determining whether the N3AN is trusted or untrusted;
generating a trust indication message identifying whether the N3AN is trusted or untrusted; and
sending the trust indication message to the UE via a secure access link established without Internet Protocol Security (IPsec) tunneling or Internet Key Exchange (IKE) messages and by the serving network via the N3AN responsive to the initial registration to facilitate establishment of the connection between the UE and the serving network.

6. The method of claim 5, wherein receiving the trust indication message comprises receiving the trust indication message in a security mode command from the serving network via the N3AN using the secure access link established by the serving network.

7. The method of claim 5, wherein the receiving the trust indication message comprises receiving the trust indication message in a registration reject message from the serving network via the N3AN using the secure access link established by the serving network.

8. The method of claim 5, wherein the determining whether the N3AN is trusted or untrusted comprises considering a trust relationship proposal provided by the serving network to the home network.

9. A home network of a User Equipment (UE) configured to establish a connection between the UE and a serving network via a non-3GPP access network (N3AN) the home network comprising one or more processing circuits configured to: receive a trust indication request from the serving network responsive to an initial registration of the UE with the serving network via the N3AN using a trusted registration procedure for trusted non-3GPP access;
  determine whether the N3AN is trusted or untrusted;
  generate a trust indication message identifying whether the N3AN is trusted or untrusted; and
  send, via a Trusted Non-3GPP Gateway Function (TNGF), the trust indication message to the UE via a secure access link established by the serving network via the N3AN responsive to the initial registration to facilitate establishment of the connection between the UE and the serving network.

10. A method of establishing a connection between a User Equipment (UE) and a serving network via a Non-3GPP Access Network (N3AN) the method implemented by the serving network and comprising:
  during an initial registration with the serving network, using a trusted registration procedure for trusted non-3GPP access;
  sending, via a Trusted Non-3GPP Gateway Function (TNGF), a trust indication message to the UE via the N3AN using a secure access link established with the UE via the N3AN responsive to the trusted registration procedure, said trust indication message identifying the N3AN as trusted or untrusted as determined by the serving network;
  when the trust indication message indicates the N3AN is untrusted, executing an untrusted registration procedure with the UE via the N3AN using the secure access link to establish the connection between the UE and the serving network;
  when the trust indication message indicates the N3AN is trusted, continuing execution of the initial registration with the UE via the N3AN using the trusted registration procedure to establish the connection between the UE and the serving network; and
  exchanging messages with the UE via the established connection.

11. The method of claim 10 further comprising the serving network determining whether the N3AN is trusted or untrusted for a purpose of establishing a connection between the UE and the serving network via the N3AN by:
  sending a trust indication request to a home network of the UE responsive to the initial registration of the UE with the serving network via the N3AN using the trusted registration procedure;
  receiving a trust indication from the home network of the UE, the received trust indication identifying the N3AN as trusted or untrusted; and
  sending the trust indication message generated responsive to the received trust indication to the UE via the secure access link.

12. The method of claim 10 wherein sending the trust indication message comprises sending the trust indication message in a security mode command to the UE via the N3AN using the secure access link established with the UE.

13. The method of claim 10 wherein sending the trust indication message comprises sending the trust indication message in a registration reject message to the UE via the N3AN secure access link established with the UE.

14. The method of claim 10 further comprising:
  implementing a timer during the execution of the untrusted registration procedure; and
  stopping the timer upon receipt of a registration request from the UE via the N3AN using the secure access link or stopping the untrusted registration procedure upon expiration of the time.

15. The method of claim 10 further comprising the serving network sending a trust relationship proposal to the home network.

16. A serving network of a User Equipment (UE) configured to establish a connection between the UE and the serving network via a non-3GPP access network (N3AN) the serving network comprising one or more processing circuits configured to: during an initial registration with the serving network, use a trusted registration procedure for trusted non-3GPP access;
  send, via a Trusted Non-3GPP Gateway Function (TNGF), a trust indication message to the UE via the N3AN using a secure access link established with the UE via the N3AN responsive to the trusted registration procedure, said trust indication message identifying the N3AN as trusted or untrusted as determined by the serving network;
  when the trust indication message indicates the N3AN is untrusted, execute an untrusted registration procedure with the UE via the N3AN using the secure access link to establish the connection between the UE and the serving network;
  when the trust indication message indicates the N3AN is trusted, continue execution of the initial registration with the UE via the N3AN using the trusted registration procedure to establish the connection between the UE and the serving network; and
  exchange messages with the UE via the established connection.

* * * * *